US012747324B2

(12) United States Patent
Tanaka et al.

(10) Patent No.: US 12,747,324 B2
(45) Date of Patent: Sep. 29, 2026

(54) ORGANOPOLYSILOXANE AND PRODUCTION METHOD THEREFOR, DISPERSANT COMPRISING ORGANOPOLYSILOXANE, AND DISPERSION CONTAINING ORGANOPOLYSILOXANE AS DISPERSANT

(71) Applicant: JNC CORPORATION, Tokyo (JP)

(72) Inventors: Shugo Tanaka, Chiba (JP); Yoshihiro Deyama, Chiba (JP)

(73) Assignee: JNC CORPORATION, Tokyo (JP)

( * ) Notice: Subject to any disclaimer, the term of this patent is extended or adjusted under 35 U.S.C. 154(b) by 646 days.

(21) Appl. No.: 18/034,880

(22) PCT Filed: Oct. 26, 2021

(86) PCT No.: PCT/JP2021/039427

§ 371 (c)(1),
(2) Date: May 1, 2023

(87) PCT Pub. No.: WO2022/107558

PCT Pub. Date: May 27, 2022

(65) Prior Publication Data

US 2023/0399469 A1 Dec. 14, 2023

(30) Foreign Application Priority Data

Nov. 20, 2020 (JP) ................................ 2020-193381

(51) Int. Cl.

| | |
|---|---|
| ***C08G 77/12*** | (2006.01) |
| ***C08F 230/08*** | (2006.01) |
| ***C08G 77/08*** | (2006.01) |
| ***C08G 77/32*** | (2006.01) |

(52) U.S. Cl.

CPC ............ *C08G 77/12* (2013.01); *C08F 230/08* (2013.01); *C08G 77/08* (2013.01); *C08G 77/32* (2013.01)

(58) Field of Classification Search

CPC ...................................................... C08G 77/12

See application file for complete search history.

(56) References Cited

U.S. PATENT DOCUMENTS

2002/0018885 A1 2/2002 Takahashi et al.

FOREIGN PATENT DOCUMENTS

| | | | |
|---|---|---|---|
| JP | 2000063873 | | 2/2000 |
| JP | 2004091743 | | 3/2004 |
| JP | 2005054099 | | 3/2005 |
| JP | 2019077845 | | 5/2019 |
| KR | 20060117259 | * | 11/2006 |

OTHER PUBLICATIONS

"International Search Report (Form PCT/ISA/210) of PCT/JP2021/039427", mailed on Jan. 11, 2022, with English translation thereof, pp. 1-4.

* cited by examiner

*Primary Examiner* — Randy P Gulakowski

(74) *Attorney, Agent, or Firm* — JCIPRNET

(57) ABSTRACT

A dispersant is capable of giving excellent filler dispersibility in a liquid medium. The dispersant is an organopolysiloxane represented by formula (1) or (2), wherein $R^1$ is a C1-12 saturated hydrocarbon group, X is a group represented by formula (3), acryloyl, alkyl, carboxyl, vinyl, methacryl, an aromatic group, amino, isocyanato, isocyanurato, epoxy, hydroxyl or mercapto, at least one X is a group represented by formula (3), m, l and k are 0 to 10, and j is 1 to 10. In formula (3), $R^2$ is a C1-12 saturated hydrocarbon group or a C6-12 aromatic hydrocarbon group, Y is a C1-8 divalent hydrocarbon group, and h is 4 to 400.

(1)

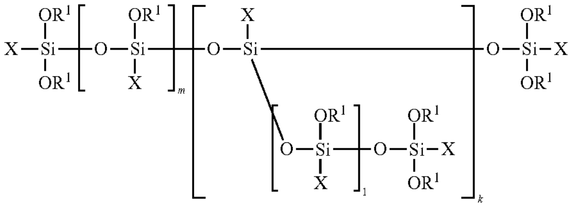

(2)

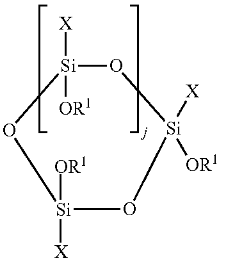

(3)

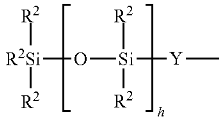

15 Claims, 14 Drawing Sheets

ORGANOPOLYSILOXANE AND PRODUCTION METHOD THEREFOR, DISPERSANT COMPRISING ORGANOPOLYSILOXANE, AND DISPERSION CONTAINING ORGANOPOLYSILOXANE AS DISPERSANT

CROSS-REFERENCE TO RELATED APPLICATION

This application is a 371 application of the International PCT application serial no. PCT/JP2021/039427, filed on Oct. 26, 2021, which claims the priority benefits of Japanese Patent Application No. 2020-193381, filed on Nov. 20, 2020. The entirety of each of the above-mentioned patent applications is hereby incorporated by reference herein and made a part of this specification.

TECHNICAL FIELD

This invention relates to an organopolysiloxane having a partial structure where T structural units are contiguously linked, and a method for producing the same, and relates to a filler dispersion containing the above organopolysiloxane as a dispersant capable of giving excellent filler dispersibility in a liquid medium.

BACKGROUND ART

As products using liquid media such as hydrocarbons, alkanols, alkenols, fatty acids, unsaturated fatty acids, esters of fatty acids and hydroxyl-containing compounds, esters of unsaturated fatty acids and hydroxyl-containing compounds, silicone oils, acrylic resins, epoxy resins and urethane resins, etc., cosmetics, liquid toners, oil-based inkjet inks, weak-solvent paints, lubricating oils, detergents, thermally conductive materials, electrically conductive materials, and optical materials, etc. are present. In addition, by dispersing fillers starting with pigments or the like in these liquid media, functions satisfying the application are given.

For example, in recent years, with the highly increasing density and integration of printed circuit boards and hybrid ICs on which electronic components such as transistors, ICs, and memory elements are mounted, and with the increase in capacity of secondary batteries (cell type), in order to efficiently dissipate the heat generated from the electronic/electrical devices such as the electronic components and the batteries, a thermally conductive silicone composition including an organopolysiloxane and a thermally conductive filler such as aluminum oxide powder and zinc oxide powder is widely used as a thermally conductive material. And, in particular, a thermally conductive silicone composition filled with a large amount of thermally conductive filler has been proposed to cope with high heat generation. However, if the filling ratio of the thermally conductive filler filled in the heat-dissipating grease or heat-dissipating sheet, etc. is increased to reduce the thermal resistance or improve the thermal conductivity, the viscosity of the resin composition used for the heat-dissipating grease or heat-dissipating sheet, etc. increases, making the discharge of the resin composition difficult. Hence, in order to reduce the thermal resistance or increase the thermal conductivity of the heat dissipating grease or heat dissipating sheet, etc., various studies have been made on combinations of thermally conductive fillers to be filled so far (see Patent Literature 1, Patent Literature 2 and Patent Literature 3). However, those combinations of thermally conductive fillers having been studied in the prior art either are not sufficient from the viewpoint of thermal conductivity, or have high viscosity even though having high thermal conductivity, and there is no combination satisfying both aspects.

In order to solve this problem, Patent Literature 4 describes a thermally conductive silicone composition filled with a thermally conductive filler, in which an organopolysiloxane having trimethoxysilyl at one end has a function of reducing the viscosity of the composition and giving fluidity and is used as a dispersant to reduce viscosity and give fluidity.

PRIOR-ART LITERATURE

Patent Literature

Patent Literature 1: JP2005-054099A
Patent Literature 2: JP2004-091743A
Patent Literature 3: JP2000-063873A
Patent Literature 4: JP2019-077845A

SUMMARY OF INVENTION

Problem to be Solved by Invention

This invention relates to an organopolysiloxane having a partial structure where T structural units are contiguously linked and a method for producing the same, and relates to a filler dispersion containing an organopolysiloxane having a partial structure where T structural units are contiguously linked as a dispersant that is capable of giving better filler dispersibility in a liquid medium as compared to an organopolysiloxane having trimethoxysilyl at one end.

An object of this invention is to provide a dispersant capable of giving excellent filler dispersibility in a liquid medium. Another object of this invention is to provide a filler dispersion which is obtained using the dispersant and in which the filler is stably dispersed.

Means for Solving Problem

As a result of intensive studies on solving the above problems, the present inventors found that an organopolysiloxane having a partial structure where T structural units are contiguously linked is useful as a dispersant, thus accomplishing this invention.

That is, with this invention, the following organopolysiloxane having a partial structure where T structural units are contiguously linked is provided as a dispersant.

This invention includes the following items, etc.

Item 1 is an organopolysiloxane represented by formula (1) or (2).

(1)

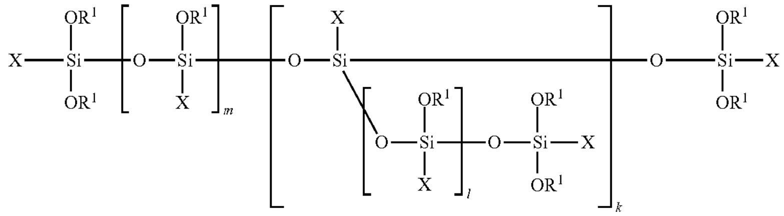

(2)

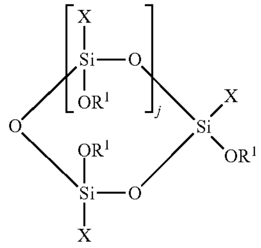

In formulae (1) and (2), each $R^1$ is independently a saturated hydrocarbon group having 1 to 12 carbons, each X is independently a group represented by formula (3), acryloyl, alkyl, carboxyl, vinyl, methacryl, an aromatic group, amino, isocyanato, isocyanurato, epoxy, hydroxyl, or mercapto, wherein at least one X is a group represented by formula (3), m, l and k are each independently 0 to 10, and j is 1 to 10;

(3)

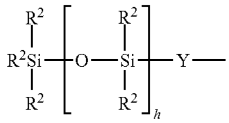

wherein in formula (3), each $R^2$ is independently a saturated hydrocarbon group having 1 to 12 carbons, or an aromatic hydrocarbon group having 6 to 12 carbons, Y is a divalent hydrocarbon group having 1 to 8 carbons, and h is 4 to 400.

Item 2 is the organopolysiloxane of item 1 which is a reaction product of an organopolysiloxane represented by formula (4) and a trialkoxysilane.

(4)

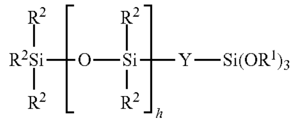

In formula (4), each $R^1$ is independently a saturated hydrocarbon group having 1 to 12 carbons, each $R^2$ is independently a saturated hydrocarbon group having 1 to 12 carbons, or an aromatic hydrocarbon group having 6 to 12 carbons, Y is a divalent hydrocarbon group having 1 to 8 carbons, and h is 4 to 400.

Item 3 is a method for producing the organopolysiloxane of item 2, which comprises reacting an organopolysiloxane represented by formula (4) with a trialkoxysilane.

Item 4 is the organopolysiloxane of item 1 which is obtained by intermolecularly reacting the organopolysiloxane represented by formula (4) described in item 2.

Item 5 is a method for producing the organopolysiloxane of item 4, which comprises intermolecularly reacting an organopolysiloxane represented by formula (4) described in item 2.

Item 6 is the method for producing an organopolysiloxane of item 3 or 5 in which an organometallic catalyst is used as a catalyst.

Item 7 is the organopolysiloxane of item 1 which is a reaction product of an organopolysiloxane represented by formula (5) and a vinyl-having alkoxysilane oligomer.

(5)

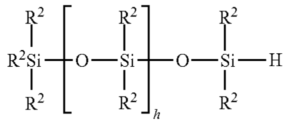

wherein in formula (5), each $R^2$ is independently a saturated hydrocarbon group having 1 to 12 carbons, or an aromatic hydrocarbon group having 6 to 12 carbons, and h is 4 to 400.

Item 8 is a method for producing the organopolysiloxane of item 7, which comprises reacting an organopolysiloxane represented by formula (5) described in item 7 with a vinyl-having alkoxysilane oligomer.

Item 9 is a dispersant used to disperse a filler in a liquid medium, which comprises the organopolysiloxane of item 1.

Item 10 is the dispersant of item 9 which has a number average molecular weight (Mn) of 500 to 100,000.

Item 11 is the dispersant of item 9 or 10 which has a molecular weight distribution index (Mw/Mn) of 1.0 to 3.0.

Item 12 is a filler dispersion, which contains a filler, a liquid medium, and the organopolysiloxane of item 1 as a dispersant.

Item 13 is the filler dispersion of item 12 in which with respect to 100 parts by mass of the filler, the content of the liquid medium is 4 to 50 parts by mass and the content of the dispersant is 0.1 to 20 parts by mass.

Effects of Invention

With this invention, a dispersant capable of stabilizing and dispersing a filler in a liquid medium can be provided.

Moreover, with this invention, a filler dispersion which is obtained using the above dispersant and in which the filler is stabilized and dispersed can be provided. The filler dispersion of this invention is useful as, for example, a cosmetic, a liquid developer, an oil-based inkjet ink, a UV-curable inkjet ink, a weak-solvent paint, an offset ink, a lubricant, a detergent, a pesticide, a release agent, an adhesive, a thermally conductive material, an electrically conductive material, or an optical material, etc.

EMBODIMENTS OF INVENTION

Figure 1:
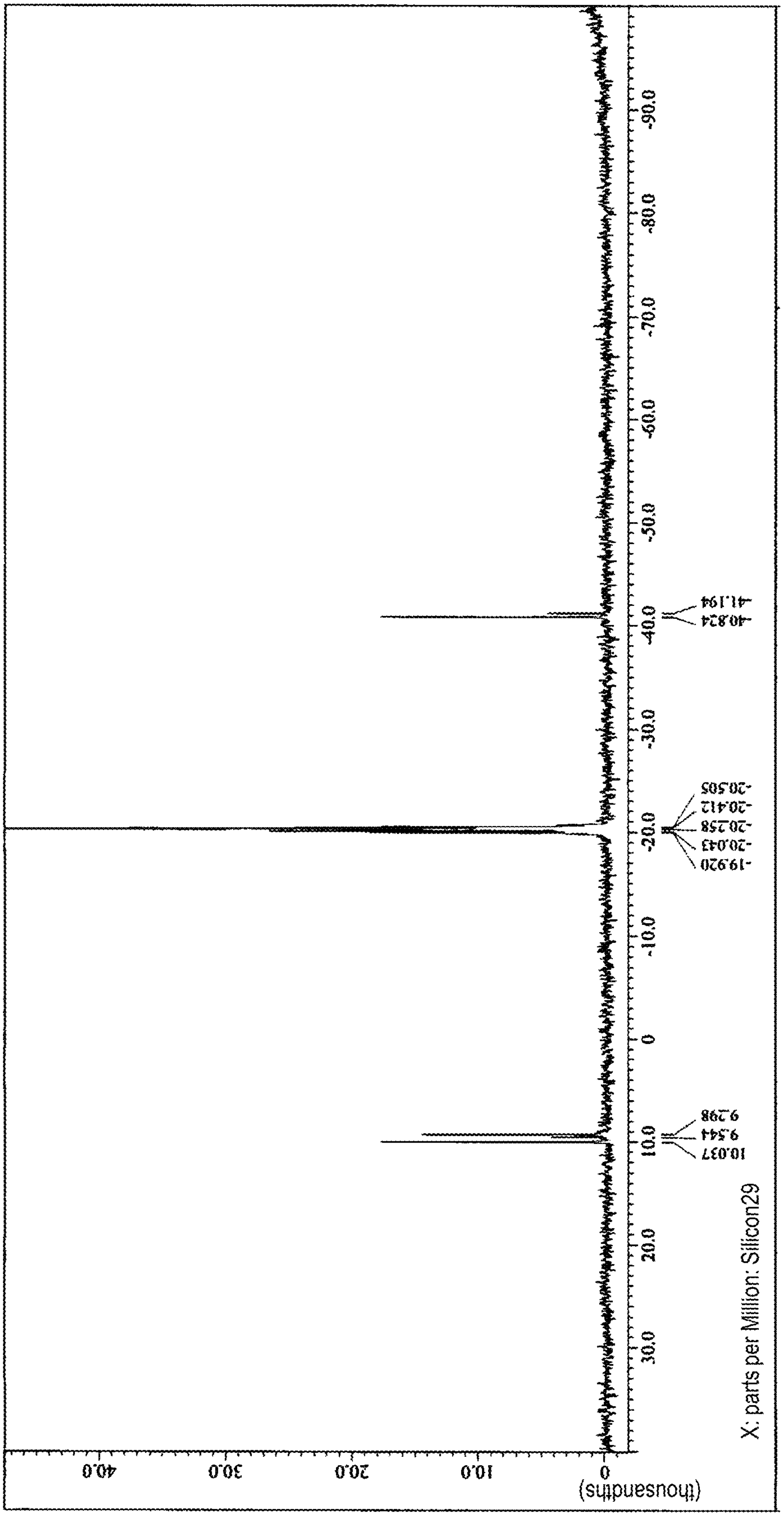
FIG. 1 is the $^{29}$Si-NMR spectrum of the polydimethylsiloxane having trimethoxysilyl at one end used in Synthesis Example 5 and Synthesis Examples 10-12, which was the slightly yellow transparent liquid obtained in Synthesis Example 1.

Embodiments of this invention will be described below, but this invention is not limited to the following embodiments.

<Dispersant>

The dispersant of this invention is an organopolysiloxane having a partial structure where T structural units $[R_1SiO_{3/2}]$ are contiguously linked, which is represented by formula (1) or (2).

(1)

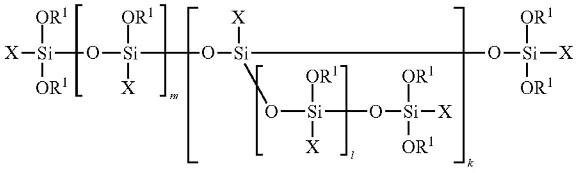

(2)

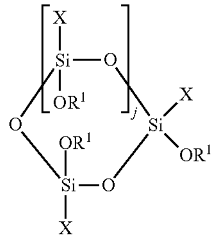

In formulae (1) and (2), each $R^1$ is independently a saturated hydrocarbon group having 1 to 12 carbons, each X is independently a group represented by formula (3), acryloyl, alkyl, carboxyl, vinyl, methacryl, an aromatic group, amino, isocyanato, isocyanurato, epoxy, hydroxyl, or mercapto, wherein at least one X is a group represented by formula (3), m, l and k are each independently 0 to 10, and j is 1 to 10.

(3)

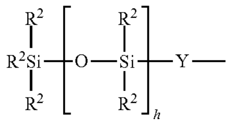

In formula (3), each $R^2$ is independently a saturated hydrocarbon group having 1 to 12 carbons, or an aromatic hydrocarbon group having 6 to 12 carbons, Y is a divalent hydrocarbon group having 1 to 8 carbons, and h is 4 to 400.

The definitions of a M structural unit, a D structural unit, a T structural unit and a Q structural unit relate to the number of attached oxygens and may be illustratively represented by the following silyl units, for example.

M: Monofunctional unit $[R_3SiO_{1/2}]$

D: Difunctional unit $[R_2SiO_{2/2}]$

T: Trifunctional unit $[R_1SiO_{3/2}]$

Q: Tetrafunctional unit $[SiO_{4/2}]$

Regarding the organopolysiloxane represented by formula (1) or (2) having a partial structure where T structural units $[R_1SiO_{3/2}]$ are contiguously linked, possible structures of the partial structure where T structural units $[R_1SiO_{3/2}]$ are contiguously linked can be exemplified by formula (7) or (8) satisfying formula (1), and formula (9) satisfying formula (2), just for providing several possibilities conceived.

(7)

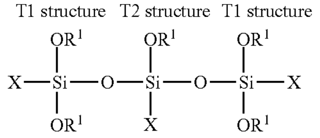

(8)

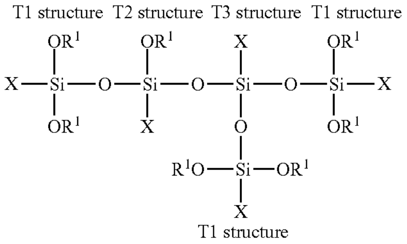

(9)

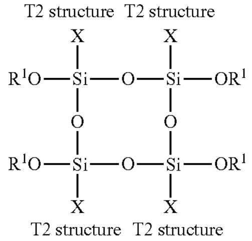

In formulae (7) to (9), each $R^1$ is independently a monovalent saturated hydrocarbon group having 1 to 12 carbons, and each X is independently a group represented by formula (3), acryloyl, alkyl, carboxyl, vinyl, methacryl, an aromatic group, amino, isocyanato, isocyanurato, epoxy, hydroxyl, or mercapto, wherein at least one X is a group represented by formula (3).

(3)

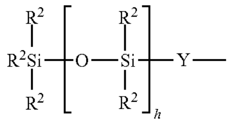

In formula (3), each $R^2$ is independently a saturated hydrocarbon group having 1 to 12 carbons, or an aromatic hydrocarbon group having 6 to 12 carbons, Y is independently a divalent hydrocarbon group having 1 to 8 carbons, and h is independently 4 to 400.

The definitions of the T structural units as the partial structures in formulae (7) to (9) relate to the number of alkoxy groups, and are classified into four types represented by formula (10), for example.

(10)

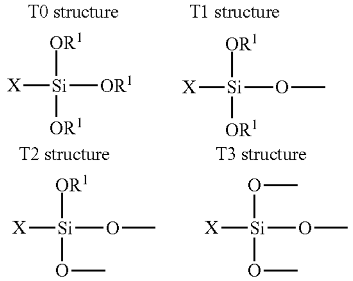

<Method for Producing an Organopolysiloxane Having a Partial Structure where T Structural Units are Contiguously Linked>

The organopolysiloxane of this invention having a partial structure where T structural units are contiguously linked can be synthesized from an organopolysiloxane having a trialkoxysilyl at one end as represented by formula (4) and an alkoxysilane compound having three alkoxy groups. Besides, the organopolysiloxane may also be a compound obtained by intermolecularly reacting an organopolysiloxane having a trialkoxysilyl at one end as represented by the formula (4). For the reaction, a solvent can be used as necessary, and as a catalyst, an acid catalyst such as hydrochloric acid, or an alkali catalyst such as ammonia, can be used for the purpose of hydrolysis, but an organometallic catalyst is preferably used.

(4)

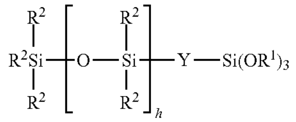

In formula (4), each $R^1$ is independently a saturated hydrocarbon group having 1 to 12 carbons, each $R^2$ is independently a saturated hydrocarbon group having 1 to 12 carbons, or a monovalent aromatic hydrocarbon group having 6 to 12 carbons, Y is independently a divalent hydrocarbon group having 1 to 8 carbons, and h is independently 4 to 400.

One kind or two or more kinds of the organopolysiloxane having a trialkoxysilyl at one end can be used. Also, an organopolysiloxane having a trialkoxysilyl at one end can be produced by a conventionally known technique. For example, there are methods such as a method of synthesizing an organopolysiloxane having a trialkoxysilyl at one end and having an arbitrary molecular weight from an organopolysiloxane having hydrosilyl at one end and having an arbitrary molecular weight, and a vinyltrialkoxysilane, in presence of a platinum catalyst. Examples of the organopolysiloxane having hydrosilyl at one end include: FM-0105 produced by JNC Corporation (number average molecular weight (Mn) is about 500), FM-0111 by JNC (Mn is about 1000), FM-0121 by JNC (Mn is about 5000), FM-0125 by JNC (Mn is about 10000), FM-0126 by JNC (Mn is about 20000), and FM-0127 by JNC (Mn is about 30000), etc. Examples of the vinyltrialkoxysilane include: vinyltrimethoxysilane (S210 by JNC) and vinyltriethoxysilane (S220 by JNC).

Regarding the organopolysiloxane having a trialkoxysilyl at one end, examples of the trialkoxysilyl include trimethoxysilyl, triethoxysilyl, and tripropoxysilyl, etc. Among these, from the viewpoints of the affinity between the filler and the dispersant that is the synthesized organopolysiloxane having a partial structure where T structural units are contiguously linked, and the availability of the vinylalkoxysilane as the raw material for producing the organopolysiloxane having a trialkoxysilyl at one end, trimethoxysilyl is preferred.

One kind or two or more kinds of the alkoxysilane compounds having three alkoxy groups can be used. Examples of the alkoxysilane compound having three alkoxy groups include: alkyl-containing alkoxysilane compounds, vinyl-containing alkoxysilane compounds, acryloyl-containing alkoxysilane compounds, methacryl-containing alkoxysilane compounds, aromatic group-containing alkoxysilane compounds, amino-containing alkoxysilane compounds, and isocyanato-containing alkoxysilane compounds, isocyanurato-containing alkoxysilane compounds, epoxy-containing alkoxysilane compounds, and mercapto-containing alkoxysilane compounds.

Examples of the alkyl-containing alkoxysilane compounds include: methyltrimethoxysilane, methyltriethoxysilane, ethyltrimethoxysilane, n-propyltrimethoxysilane, n-propyltriethoxysilane, isobutyltrimethoxysilane, isobutyltriethoxysilane, n-hexyltrimethoxysilane, n-hexyltriethoxysilane, n-octyltriethoxysilane, and n-decyltrimethoxysilane. Examples of the vinyl-containing alkoxysilane compounds include: vinyltrimethoxysilane and vinyltriethoxysilane. Examples of the acryloyl-containing alkoxysilane compounds include: 3-acryloxypropyltrimethoxysilane. Examples of the methacryl-containing alkoxysilane compounds include: 3-methacryloxypropyltrimethoxysilane and 3-methacryloxypropyltriethoxysilane. Examples of the aromatic group-containing alkoxysilane compounds include: phenyltrimethoxysilane and phenyltriethoxysilane. Examples of the amino-containing alkoxysilane compounds include: N-2-(aminoethyl)-3-aminopropyltrimethoxysilane, 3-aminopropyltrimethoxysilane, 3-aminopropyltriethoxysilane, and N-phenyl-3-aminopropyltrimethoxysilane. Examples of the isocyanato-containing alkoxysilane compounds include: 3-isocyanatopropyltriethoxysilane. Examples of the isocyanurato-containing alkoxysilane compounds include: tris-(trimethoxysilylpropyl)isocyanurate. Examples of the epoxy-containing alkoxysilane compounds include: 2-(3,4-epoxycyclohexyl)ethyltrimethoxysilane, 3-glycidoxypropyltrimethoxysilane, and 3-glycidoxypropyltriethoxysilane. Examples of the mercapto-containing alkoxysilane compounds include: 3-mercaptopropyltrimethoxysilane.

The solvent may be one or more selected from nonpolar solvents and polar solvents. Examples of the nonpolar solvents include: hydrocarbons such as n-hexane, n-heptane and isooctane, and aromatic hydrocarbons such as toluene and xylene. Examples of the polar solvents include: water; alcohols such as methanol, ethanol and isopropanol; alcohol esters; ketones such as acetone, methyl ethyl ketone and cyclohexanone; ethers such as diethyl ether, dibutyl ether and tetrahydrofuran; esters such as ethyl acetate, isopropyl acetate and butyl acetate; hydrocarbon cyanides such as acetonitrile; amines; amides such as acetamide; halogenated hydrocarbons such as methylene chloride, chloroform and hexafluoro-m-xylene; and sulfur-containing compounds such as dimethyl sulfoxide. The use amount of the solvent is not particularly limited, and may be adjusted as appropriate. Generally, the concentration of the organosilicon compound to be reacted is 5 to 95 mass %, preferably 20 to 80 mass %. In addition, the reaction in the production method of this invention can also be carried out in a non-solvent system.

As the organometallic catalyst, it is possible to use an organotin compound such as dibutyltin dilaurate or dibutyltin di-2-ethylhexoate, or an organometallic compound based on bismuth, zinc or zirconium, but it is preferred to use a titanium alkoxide compound as a catalyst. Examples of the titanium alkoxide compound include: tetra(2-ethylhexyl) titanate, titanium tetra-n-butoxide, titanium tetraisopropoxide, titanium diisopropoxybis(ethylacetoacetate), titanium tetraacetylacetonate, titanium di-2-ethylhexoxybis(2-ethyl-3-hydroxyhexoxide), and titanium diisopropoxybis(acetylacetonate), etc. As the catalytic amount of the titanium alkoxide compound, 0.1 to 10 parts by weight can be used with respect to 100 parts by weight of the organopolysiloxane having a trialkoxysilyl at one end. If the catalyst amount of the titanium alkoxide compound is less than 0.1 part by weight, the reaction will not be completed. If the catalyst amount is more than 10 parts by weight, other problems such as yellowing may occur.

Further, the organopolysiloxane of this invention having a partial structure where T structural units are contiguously linked can be synthesized from an organopolysiloxane having hydrosilyl at one end as represented by formula (5) and a vinyl-having alkoxysilane oligomer. For the reaction, a solvent as described above can be used as necessary, and a transition metal catalyst such as a platinum catalyst or a rhodium catalyst is preferably used as a catalyst.

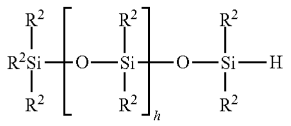

(5)

In formula (5), each $R^2$ is independently a saturated hydrocarbon group having 1 to 12 carbons, or an aromatic hydrocarbon group having 6 to 12 carbons, and h is 4 to 400.

One kind or two or more kinds of the organopolysiloxane having hydrosilyl at one end can be used. Examples of the organopolysiloxane having hydrosilyl at one end include: FM-0105 (number average molecular weight (Mn) is about 500) produced by JNC Corporation, FM-0111 (Mn is about 1000) by JNC, FM-0121 (Mn is about 5000) by JNC, FM-0125 (Mn is about 10000) by JNC, FM-0126 (Mn is about 20000) by JNC, and FM-0127 (Mn is about 30000) by JNC.

The vinyl-having alkoxysilane oligomer can be produced by hydrolyzing and condensing vinyltrimethoxysilane, vinyltriethoxysilane or vinyltripropoxysilane, etc. in presence of an acid catalyst or an alkali catalyst, according to a conventionally known technique. Examples of the vinyl-having alkoxysilane oligomer include DYNASYLAN 6490 produced by EVONIC company, and DYNASYLAN 6498 produced by EVONIC company.

Examples of the transition metal catalyst include: pure platinum; platinum solids dispersed on a carrier such as alumina, silica or carbon black; chloroplatinic acid; complexes of chloroplatinic acid with an alcohol, aldehyde or ketone, etc.; platinum-olefins complexes; platinum (0)-divinyltetramethyldisiloxane complex; compounds other than platinum compounds, such as $RhCl(PPh_3)_3$, $RhCl_3$, $RuCl_3$, $IrCl_3$, $FeCl_3$, $AlCl_3$, $PdCl_2 \cdot H_2O$, $NiCl_2$ and $TiCl_4$, etc.; and so on.

The dispersant that is the organopolysiloxane of this invention having a partial structure where T structural units are contiguously linked has a number average molecular weight (Mn) of 500 to 100,000, more preferably 1000 to 60,000, as measured with gel permeation chromatography (GPC). If the molecular weight is too small, steric repulsion is not exhibited when the filler is dispersed, and a stable dispersion cannot be obtained. On the other hand, if the molecular weight is too large, the wettability with the filler will be insufficient, and the viscosity of the dispersion will increase.

The dispersant that is the organopolysiloxane of this invention having a partial structure where T structural units are contiguously linked can be synthesized from an organopolysiloxane having a trialkoxysilyl at one end as represented by formula (4), wherein the number average molecular weight and the molecular weight distribution index (Mw/Mn) of the dispersant can be adjusted by using a required amount of an organopolysiloxane having a trialkoxysilyl at one end and having arbitrary number average molecular weight and molecular weight distribution index (Mw/Mn). Besides, the dispersant of this invention can also be synthesized from an organopolysiloxane having hydrosilyl at one end as represented by formula (5), wherein the number average molecular weight and the molecular weight distribution index (Mw/Mn) of the dispersant can be adjusted by using a required amount of an organopolysiloxane having hydrosilyl at one end and having arbitrary number average molecular weight and molecular weight distribution index (Mw/Mn).

The dispersant of this invention is used to disperse fillers in liquid media. Examples of the liquid media include: hydrocarbons, alkanols, alkenols, fatty acids, unsaturated fatty acids, esters of fatty acids and hydroxyl-containing compounds, esters of unsaturated fatty acids and hydroxyl-containing compounds, silicone oils, acrylic resins, epoxy resins, and urethane resins, etc. These liquid media can be used singly or in combination of two or more. A liquid medium suitably as a thermally conductive material is silicone oil.

Examples of the hydrocarbons include: hexane, hexene, 2-ethylhexane, heptane, heptene, cyclohexane, cycloheptane, octane, octene, 2-ethylhexane, nonane, decane, isodecane, dodecane, isododecane, tridecane, undecane, octadecane, C8-20 isoparaffins, squalane, vaseline, microcrystalline wax, hydrogenated polyisobutene, 1-octene, 2-octene, 1-nonene, 2-nonene, 1-decene, 2-decene, 1-undecene, 2-undecene, 1-dodecene, 2-dodecene, 1-tridecene, 2-tridecene, 1-tetradecene, 2-tetradecene, 1-pentadecene, 2-pentadecene, 1-hexadecene, 2-hexadecene, 1-heptadecene, 2-heptadecene, 1-octadecene, 2-octadecene, dimethylcyclohexane, trimethylcyclohexane, ethylcyclohexane, and propylcyclohexane, etc.

Examples of the alkanols and the alkenols include: octanol, 2-ethylhexanol, nonanol, decanol, isodecanol, dodecanol, cetyl alcohol, stearyl alcohol, arachyl alcohol, behenyl alcohol, hexyldecanol, octyldodecanol, isocetyl alcohol, isostearyl alcohol, and oleyl alcohol, etc.

Examples of the fatty acids and the unsaturated fatty acids include: octanoic acid, nonanoic acid, decanoic acid, dodecanoic acid, tridecanoic acid, stearic acid, oleic acid, 1,2-hydroxystearic acid, ricinolic acid, ricinoleic acid, undecylenic acid, isononanoic acid, myristic acid, palmitic acid, and 2-ethylhexanoic acid, etc.

Examples of the esters of fatty acids and hydroxyl-containing compounds and the esters of unsaturated fatty acids and hydroxyl-containing compounds include: methyl laurate, heptyl undecylenate, isononyl isononanoate, ethyl oleate, isopropyl myristate, isopropyl palmitate, butyl stearate, cetyl palmitate, myristyl myristate, octyldodecyl myristate, isopropyl isostearate, ethyl isostearate, cetyl 2-ethylhexanoate, hexyl isostearate, ethylene glycol di-2-ethylhexanoate, ethylene glycol dioleate, propylene glycol di(caprylate/caprate), propylene glycol dioleate, trimethylolpropane triisostearate, pentaerythrityl tetra-2-ethylhexanoate, neopentyl glycol diheptanoate, isocetyl isostearate, 2-octyldodecyl dimethyloctanoate, myristyl lactate, trioctyldodecyl citrate, diisostearyl malate, di-2-ethylhexyl succinate, diisopropyl adipate, diisobutyl adipate, and cholesteryl stearate, etc. More examples include: oils and fats such as almond oil, avocado oil, olive oil, shea butter, shea oil, evening primrose oil, passionflower seed oil, *camellia* oil, babassu oil, peanut oil, and rosehip oil, etc. which are triesters with glycerin; and waxes such as beeswax, Japanese wax, jojoba oil, candelilla wax, and carnauba wax, etc.

Examples of the silicone oils include: dimethyl silicone oil, methylphenyl silicone oil, methyl hydrogen silicone oil, amino-modified silicone oil, epoxy-modified silicone oil, carboxy-modified silicone oil, carbinol-modified silicone oil, polyether-modified silicone oil, alkyl-modified silicone oil, and fluorine-modified silicone oil, etc.

Examples of the acrylic resins include: monofunctional (meth)acrylates, difunctional (meth)acrylates, trifunctional or higher polyfunctional (meth)acrylates, epoxy (meth)acrylates, urethane (meth)acrylates, and bifunctional or higher polyesters (meth)acrylates, etc.

Examples of the epoxy resin include a combination of a main agent such as an alcohol-based glycidyl ether such as a polypropylene glycol or a phenolic glycidyl ether of bisphenol A, bisphenol F or a phenol novolak, etc., and a curing agent. Examples of the curing agent include: amine compounds such as aliphatic polyamines, modified aliphatic polyamines, polyamidoamines, polyamides, alicyclic polyamines, modified alicyclic polyamines, modified aromatic polyamines and tertiary amines, etc., etc. These curing agents may be used singly or in combination of two or more. A reaction accelerator that accelerates the reaction between the main agent and the curing agent can also be used. Examples of the reaction accelerator includes: phenol, p-t-butylphenol, di-t-butylphenol, cresol, triphenylphosphite, salicylic acid, and triethanolamine, etc. These reaction accelerators may be used singly or in combination of two or more.

Examples of the urethane resins include: reaction products of hydroxyl-containing compounds and polyisocyanate compounds, for example, a linear multi-block copolymer of polyurethane obtained by a reaction of a short-chain glycol or short-chain ether as a hard segment with an isocyanate compound, and polyurethane obtained by a reaction of a long-chain glycol or long-chain ether as a soft segment with the same. In addition, a reaction product (cured product) of a urethane prepolymer and a polyisocyanate compound can be used.

Examples of the fillers include: inorganic pigments, organic pigments, extender pigments, filling agents, inorganic fine particles, diamond, graphene, graphite, carbon black, carbon nanotubes, clay, conductive fillers, thermal conductive agents, carbon fibers, glass fibers, cellulose, and cellulose nanofibers, etc. These fillers are particulate, powdery, or fibrous substances added to plastics, rubbers, paints, inks, etc. for the purpose of improving strength or functionality and reducing costs. The crystal form, particle size, surface state, and presence/absence of surface treatment, etc. of the filler are not particularly limited. The filler (thermally conductive agent) of the thermally conductive material is preferably aluminum oxide, zinc oxide, aluminum nitride or boron nitride, more preferably aluminum oxide.

<Filler Dispersion>

The filler dispersion of this invention contains a filler, a liquid medium, and a dispersing agent that disperses the filler in the liquid medium. The dispersant is the aforementioned organopolysiloxane having a partial structure where T structural units are contiguously linked. As the liquid medium, the liquid media described above are used. Among them, it is preferred to use silicone oil. In addition to the liquid medium, for example, various organic solvents, monomers, and liquid oligomers, etc. can also be used.

As the filler, the fillers mentioned above are used. Among them, aluminum oxide, zinc oxide, aluminum nitride or boron nitride is preferred, and aluminum oxide is more preferred.

The filler dispersion preferably contains 4 to 50 parts by mass, more preferably 5 to 30 parts by mass, of the liquid medium with respect to 100 parts by mass of the filler. In addition, the filler dispersion preferably contains 0.1 to 20 parts by mass, more preferably 0.5 to 10 parts by mass, of the dispersant with respect to 100 parts by mass of the filler. If the content of the dispersant with respect to 100 parts by mass of the filler is less than 0.1 part by mass, it may be difficult to stably disperse the filler. On the other hand, if the content of the dispersant with respect to 100 parts by mass of the filler is more than 10 parts by mass, an excessive amount of the dispersant not contributing to dispersion of the filler will be included.

Various additives such as other surfactants, plasticizers and antifoaming agents can be added to the filler dispersion of this invention, as long as the purpose of the filler dispersion is not impaired.

The filler dispersion of this invention can be produced according to a known filler dispersion production method. For example, a method of adding a filler to a liquid medium added with a dispersant and then stirring and mixing, and a method of adding a liquid medium and a dispersant to a filler and then stirring and mixing can be used. A known dispersing machine can be used as a dispersing device for stirring, mixing or dispersing, and examples thereof include: roll mills, ball mills, bead mills, sand mills, homogenizers, dispersers, and planetary centrifugal mixers. Dispersion treatment can also be carried out in an ultrasonic bath.

EXAMPLES

This invention will be described in more details below, wherein "part" and "%" in the Examples are based on mass (part by mass, mass %) unless otherwise specified. Moreover, this invention is not limited at all by these Examples.

<Measurement of Molecular Weight>

The molecular weight of the organopolysiloxane was measured with gel permeation chromatography (GPC), and the ratio of the weight average molecular weight (Mw) to the number average molecular weight (Mn) was referred to as the molecular weight distribution index (Mw/Mn). Polystyrene equivalent molecular weights were measured using polystyrene as a standard sample.

The measurement of polystyrene-equivalent molecular weight with the GPC method was performed under the following measurement conditions.

a) Measuring machine: HPLC LC-2000 Plus series made by JASCO Corporation.
b) Column: Shodex KF-804L×2.
c) Oven temperature: 40° C.
d) Eluent: toluene 0.7 mL/min.
e) Standard sample: polystyrene.
f) Injection volume: 20 μL.
g) Concentration: 0.05 g/10 mL.
h) Sample preparation: the organopolysiloxane was dissolved under stirring at room temperature using toluene a solvent.

<Nuclear Magnetic Resonance Spectrum (NMR)>

JNM-ECZ400S made by JEOL Ltd. was used. $^{29}$Si-NMR was measured without solvent. In $^{29}$Si-NMR, the peak detection magnetic fields derived from the T structural units is generally on the high magnetic field side in the order of T3>T2>T1>T0, so the formation of the organopolysiloxane of this invention having a partial structure where T structural unis are contiguously linked was confirmed by appearance of peaks of T1 to T3 structures.

Synthesis Example 1: Synthesis of Organopolysiloxane Having an Alkoxysilyl at One End and Having a Number Average Molecular Weight of 1500

Into a 500 ml four-necked flask equipped with a stirrer, a thermometer and a reflux condenser, 300 g of a polydimethylsiloxane having hydrosilyl at one end (number average molecular weight (Mn) was 1300) and 55 g of vinyltrimethoxysilane (S210 produced by JNC Corporation, with a molecular weight of 148.2) were weighed, and the temperature was raised to 70° C. under stirring in a nitrogen atmosphere. After reaching 70° C., 4 μL of Pt-VTSC-3.0X produced by Umicore Japan company was added as a Karstedt catalyst, and the mixture was stirred at 70° C. for 1 hour. After cooling to room temperature, the reflux condenser was replaced by a distillation head with a collection flask. Next, the mixture was heated at 150° C. for 1 hour under a reduced pressure of 5 kPaA made by a vacuum pump, and then further heated at 150° C. for 2 hours under a reduced pressure of 0.1 kPaA made by the vacuum pump to distill off the volatile substances remaining in the product, thus obtaining 338 g of a slightly yellow transparent liquid as a polydimethylsiloxane having trimethoxysilyl at one end.

GPC: number average molecular weight (Mn)=1500, weight average molecular weight (Mw)=1700, molecular weight distribution index (Mw/Mn)=1.14. $^{29}$Si-NMR: δ (ppm); 10.0 (M), 9.3 to 9.5 (M), −20.5 to −19.9 (D), −41.2 to −40.8 (T).

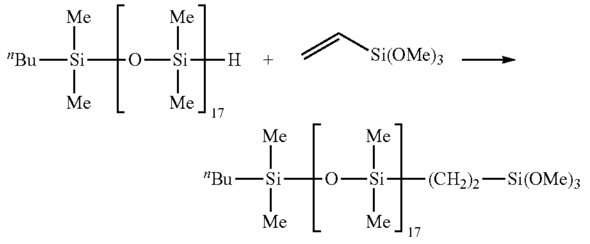

Synthesis Example 2: Synthesis of an Organopolysiloxane Having an Alkoxysilyl at One End and Having a Number Average Molecular Weight of 6500

Into a 2000 ml four-necked flask equipped with a stirrer, a thermometer and a reflux condenser, 1000 g of a polydimethylsiloxane having hydrosilyl at one end (Mn=5000) and 45 g of vinyltrimethoxysilane (S210 by JNC, with a molecular weight of 148.2) were weighed, and the temperature was raised to 70° C. under stirring in a nitrogen atmosphere. After reaching 70° C., 12 μL of Pt-VTSC-3.0X produced by Umicore Japan company was added as a Karstedt catalyst, and the mixture was stirred at 70° C. for 1 hour. After cooling to room temperature, the reflux condenser was replaced with a distillation head with a collection flask. Next, the mixture was heated at 150° C. for 1 hour under a reduced pressure of 5 kPaA made by using a vacuum pump, and then further heated at 150° C. for 2 hours under a reduced pressure of 0.1 kPaA made by using the vacuum pump to distill off the volatile substances remaining in the product, thus obtaining 1010 g of a slightly yellow transparent liquid as a polydimethylsiloxane having trimethoxysilyl at one end.

GPC: Mn=6500, Mw=6900, Mw/Mn=1.05. $^{29}$Si-NMR: δ (ppm); 8.6 (M), 7.9 to 8.2 (M), −22.2 to −21.3 (D), −42.5 to −42.2 (T).

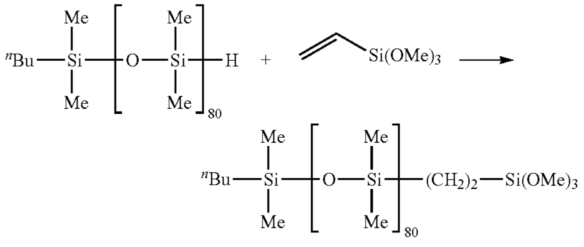

Synthesis Example 3: Synthesis of Organopolysiloxane Having an Alkoxysilyl at One End and Having a Number Average Molecular Weight of 12000

Into a 1000 ml four-necked flask equipped with a stirrer, a thermometer and a reflux condenser, 659 g of a polydimethylsiloxane having hydrosilyl at one end (Mn=11100) and 20 g of vinyltrimethoxysilane (S210 by JNC, with a molecular weight of 148.2) were weighed, and the temperature was raised to 70° C. under stirring in a nitrogen atmosphere. After reaching 70° C., 76 μL of Pt-VTSC-3.0X produced by Umicore Japan company was added as a Karstedt catalyst, and the mixture was stirred at 70° C. for 1 hour. After cooling to room temperature, the reflux condenser was replaced with a distillation head with a collection flask. Next, the mixture was heated at 120° C. for 1 hour under a reduced pressure of 0.3 kPaA made by using a vacuum pump to distill off the volatile substances remaining in the product, thus obtaining 663 g of a slightly yellow transparent liquid as a polydimethylsiloxane having trimethoxysilyl at one end.

GPC: Mn=11600, Mw=12000, Mw/Mn=1.04. $^{29}$Si-NMR: 7.3 to 8.1 (M), −22.8 to −21.8 (D), −43.0 to −42.7 (T).

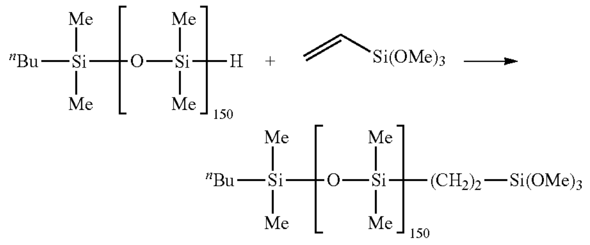

Synthesis Example 4: Synthesis of an Organopolysiloxane Having an Alkoxysilyl at One End and Having a Number Average Molecular Weight of 17000

Into a 1000 ml four-necked flask equipped with a stirrer, a thermometer and a reflux condenser, 697 g of a polydimethylsiloxane having hydrosilyl at one end (Mn=17100) and 14 g of vinyltrimethoxysilane (S210 by JNC, with a molecular weight of 148.2) were weighed, and the temperature was raised to 70° C. under stirring in a nitrogen atmosphere. After reaching 70° C., 81 μL of Pt-VTSC-3.0X produced by Umicore Japan company was added as a Karstedt catalyst, and the mixture was stirred at 70° C. for 1 hour. After cooling to room temperature, the reflux condenser was replaced with a distillation head with a collection flask. Next, the mixture was heated at 120° C. for 1 hour under a reduced pressure of 0.3 kPaA made by using a vacuum pump to distill off the volatile substances remaining in the product, thus obtaining 703 g of a slightly yellow transparent liquid as a polydimethylsiloxane having trimethoxysilyl at one end.

GPC: Mn=16900, Mw=17600, Mw/Mn=1.04. $^{29}$Si-NMR: 7.9 to 8.6 (M), −22.2 to −21.2 (D), −42.4 to −42.2 (T).

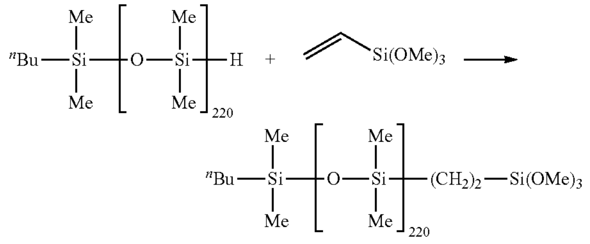

Synthesis Example 5: Synthesis of an Organopolysiloxane Having a Partial Structure where T Structural Units are Contiguously Linked and Having a Mn of 7200

Into a 100 ml two-necked flask equipped with a stirrer, a thermometer and a reflux condenser, 30 g of a polydimethylsiloxane having trimethoxysilyl at one end (Mn=1500, Mw=1700, Mw/Mn=1.14) and 11 mg of tetra(2-ethylhexyl) titanate (by FUJIFILM Wako Pure Chemical Corporation; molecular weight=564.8) were weighed, the temperature was raised under stirring in a nitrogen atmosphere, and the mixture was stirred at 60-70° C. for 4 hours. Then, a liquid obtained by mixing 0.72 g of water in 10 g of tetrahydrofuran was fed at 70° C. over 5 minutes, and the mixture was stirred at 60° C. for 2 hours. Subsequently, tetra(2-ethyl-hexyl) titanate was added 5 times over 22 hours in a total amount of 681 mg at 60-70° C.

After cooling to room temperature, the reaction solution was transferred to a separatory funnel, added with 20 g of normal hexane and 20 g of water, shaken and allowed to stand. After the mixture was confirmed to separate into two layers, the lower aqueous layer was extracted from the separatory funnel. Further, an operation, in which 50 g of water was added to the separatory funnel, the mixture was shaken and allowed to stand still, and, after the mixture was confirmed to separate into two layers, the lower aqueous layer was extracted from the separatory funnel, was performed twice.

The 56 g of oil layer remaining in the separatory funnel was transferred to a 100 ml two-necked flask equipped with a stirrer, a thermometer, a collection flask and a distillation head, and was heated at 25° C. for 2 hours under a reduced pressure of 0.3 kPaA made by using a vacuum pump to distill off the volatile substances remaining in the product, thus obtaining 25 g of a slightly yellow transparent liquid remaining in the flask.

GPC: Mn=7200, Mw=8700, Mw/Mn=1.21. $^{29}$Si-NMR: δ (ppm); 6.9 to 7.5 (M), −22.9 to −22.2 (D), −48.7 (T), −57.3 (T), −67.4 (T).

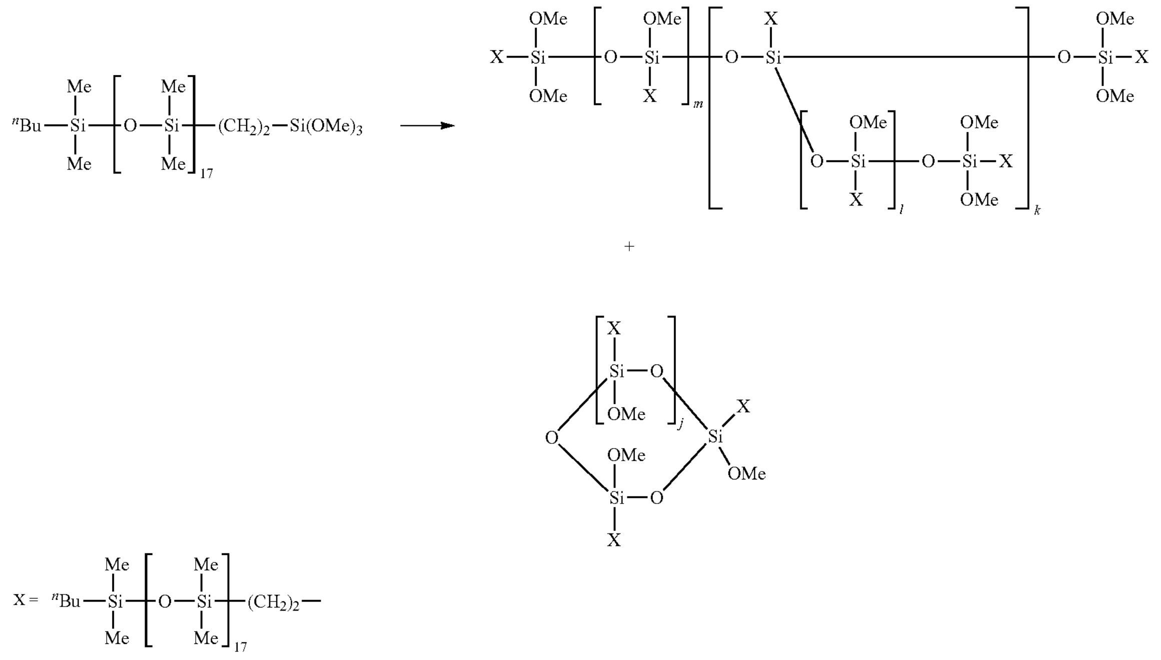

Figure 5:
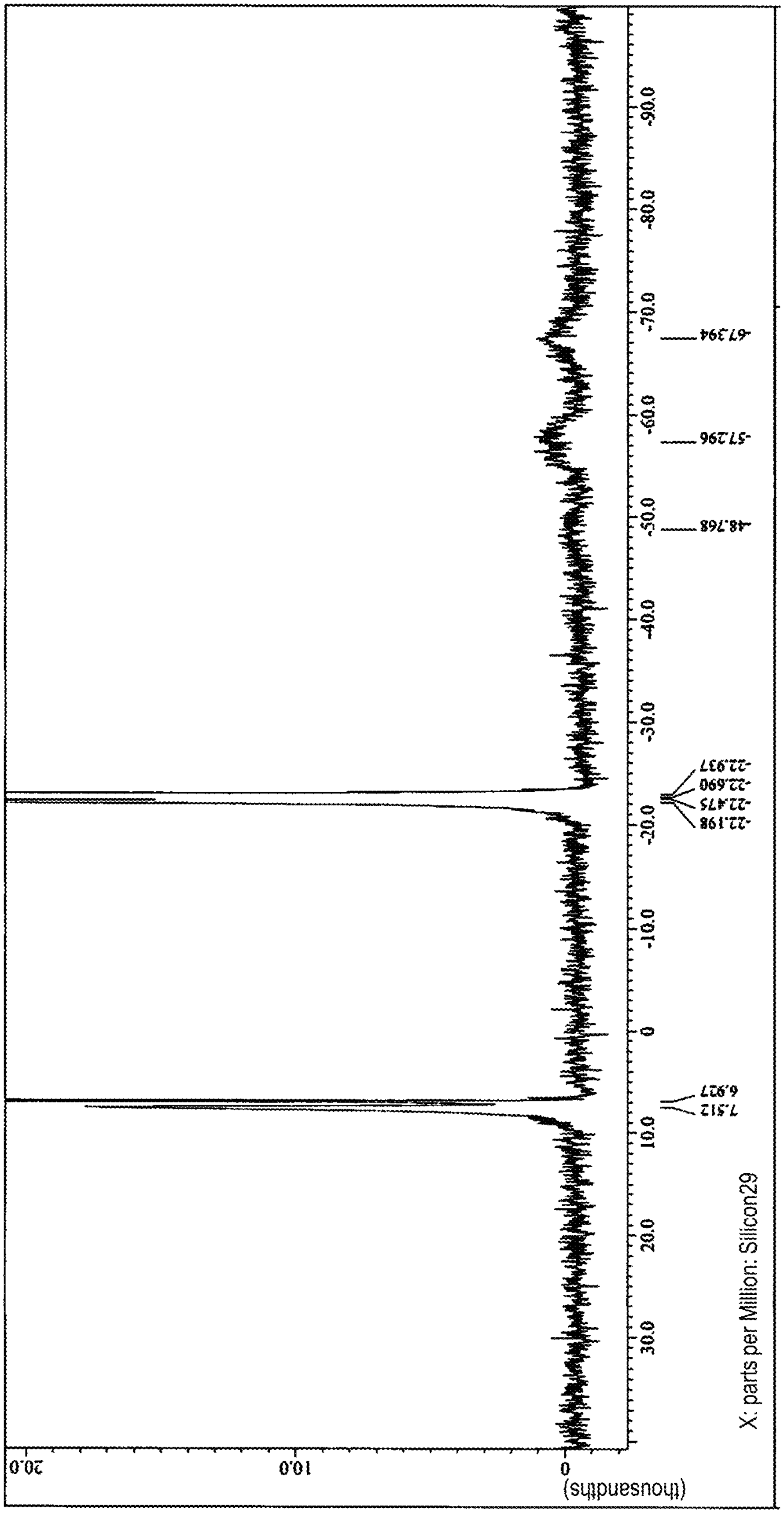
FIG. 5 is the $^{29}$Si-NMR spectrum of the slightly yellow transparent liquid obtained in Synthesis Example 5.

FIG. 5 shows the $^{29}$Si-NMR spectrum of the slightly yellow transparent liquid obtained in Synthesis Example 5, and FIG. 1 shows the $^{29}$Si-NMR spectrum of the polydimethylsiloxane having trimethoxysilyl at one end used in Synthesis Example 5. In the $^{29}$Si-NMR spectrum of FIG. 5, the peaks of −41.2 ppm to −40.8 ppm coming from the T units of the polydimethylsiloxane having trimethoxysilyl at one end disappeared, and broad peaks at −48.7 ppm, −57.3 ppm and −67.4 ppm were newly confirmed.

Based on the above analysis results, the obtained slightly yellow transparent liquid was determined to be an organopolysiloxane having a partial structure where T structural units were contiguously linked and having a number average molecular weight of 7200.

Synthesis Example 6: Synthesis of an Organopolysiloxane Having a Partial Structure where T Structural Units are Contiguously Linked and Having a Mn of 28000

Into a 100 ml two-necked flask equipped with a stirrer, a thermometer and a reflux condenser, 30 g of a polydimethylsiloxane having trimethoxysilyl at one end (Mn=6500, Mw=7200, Mw/Mn=1.12) and 11 mg of tetra(2-ethylhexyl) titanate (by FUJIFILM Wako Pure Chemical Corporation; molecular weight=564.8) were weighed, the temperature was raised under stirring in a nitrogen atmosphere, and the mixture was stirred at 60° C. for 2 hours. Thereafter, a liquid obtained by mixing 0.16 g of water in 10 g of tetrahydrofuran was fed at 60° C. over 5 minutes, and the mixture was stirred at 60° C. for 1 hour. Subsequently, tetra(2-ethylhexyl) titanate was added 5 times over 18 hours in a total amount of 681 mg at 60-70° C.

After cooling to room temperature, the reaction solution was transferred to a separatory funnel, added with 20 g of normal hexane and 30 g of water, shaken and allowed to stand. After the mixture was confirmed to separate into two layers, the lower aqueous layer was extracted from the separatory funnel. Further, an operation, in which 30 g of water was added to the separatory funnel, the mixture was shaken and allowed to stand still, and, after the mixture was confirmed to separate into two layers, the lower aqueous layer was extracted from the separatory funnel, was performed twice.

The 57 g of oil layer remaining in the separatory funnel was transferred to a 100 ml two-necked flask equipped with a stirrer, a thermometer, a collection flask and a distillation head, and was heated at 40° C. for 2 hours under a reduced pressure of 0.3 kPaA made by using a vacuum pump to distill off the volatile substances remaining in the product, thus obtaining 28 g of a colorless transparent liquid remaining in the flask.

GPC: Mn=28000, Mw=37500, Mw/Mn=1.34. $^{29}$Si-NMR: δ (ppm); 7.8 to 8.5 (M), −22.2 to −21.3 (D), −56.7 (T), −66.1 (T).

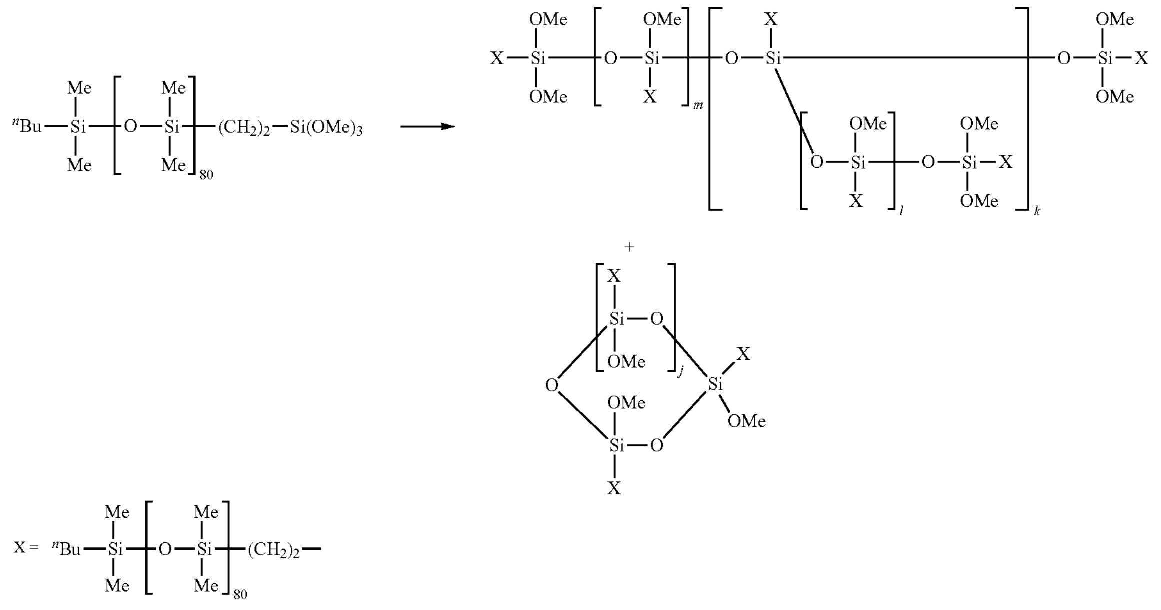

Figure 2:
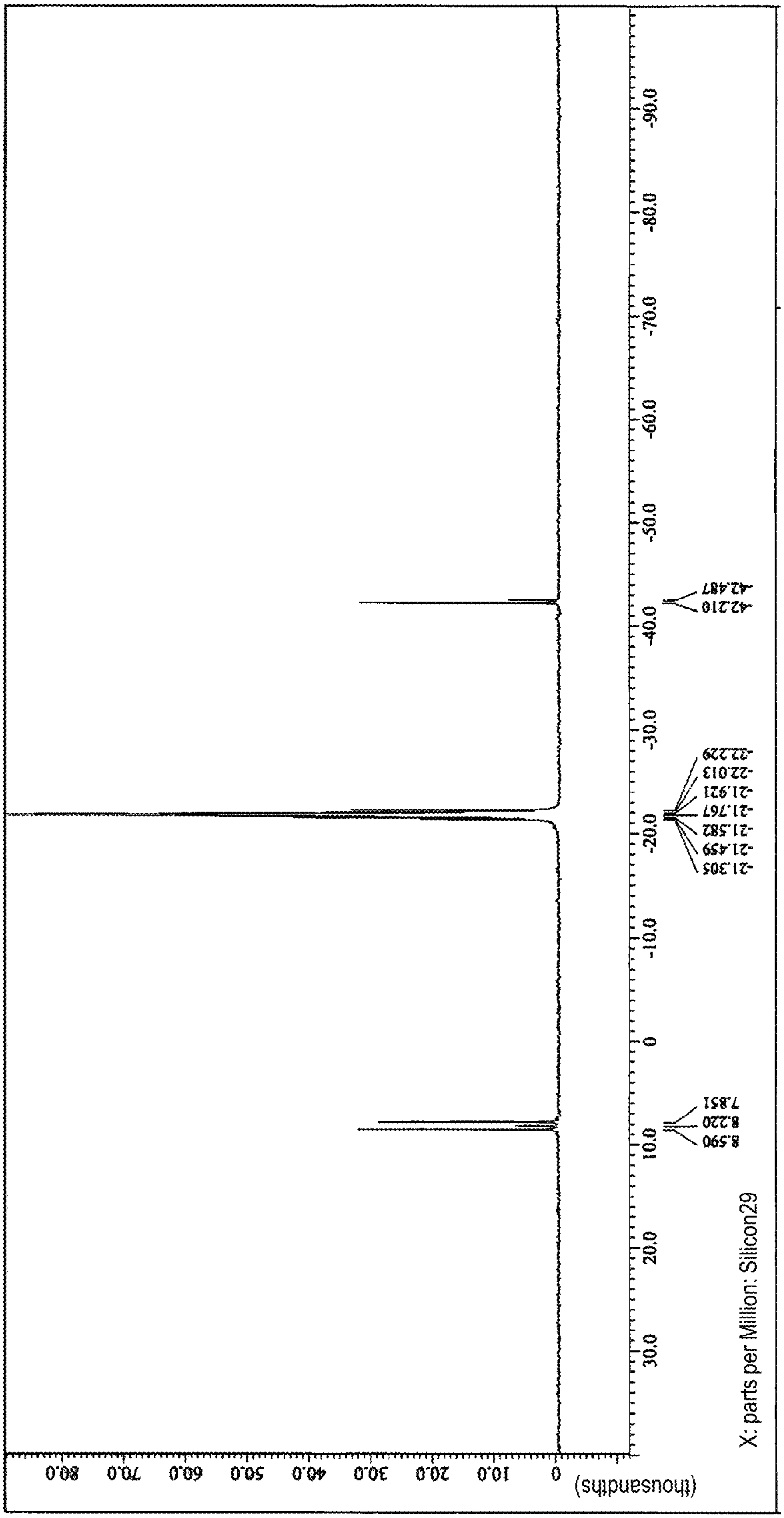
FIG. 2 is the $^{29}$Si-NMR spectrum of the polydimethylsiloxane having trimethoxysilyl at one end used in Synthesis Example 6, which was the slightly yellow transparent liquid obtained in Synthesis Example 2.
Figure 3:
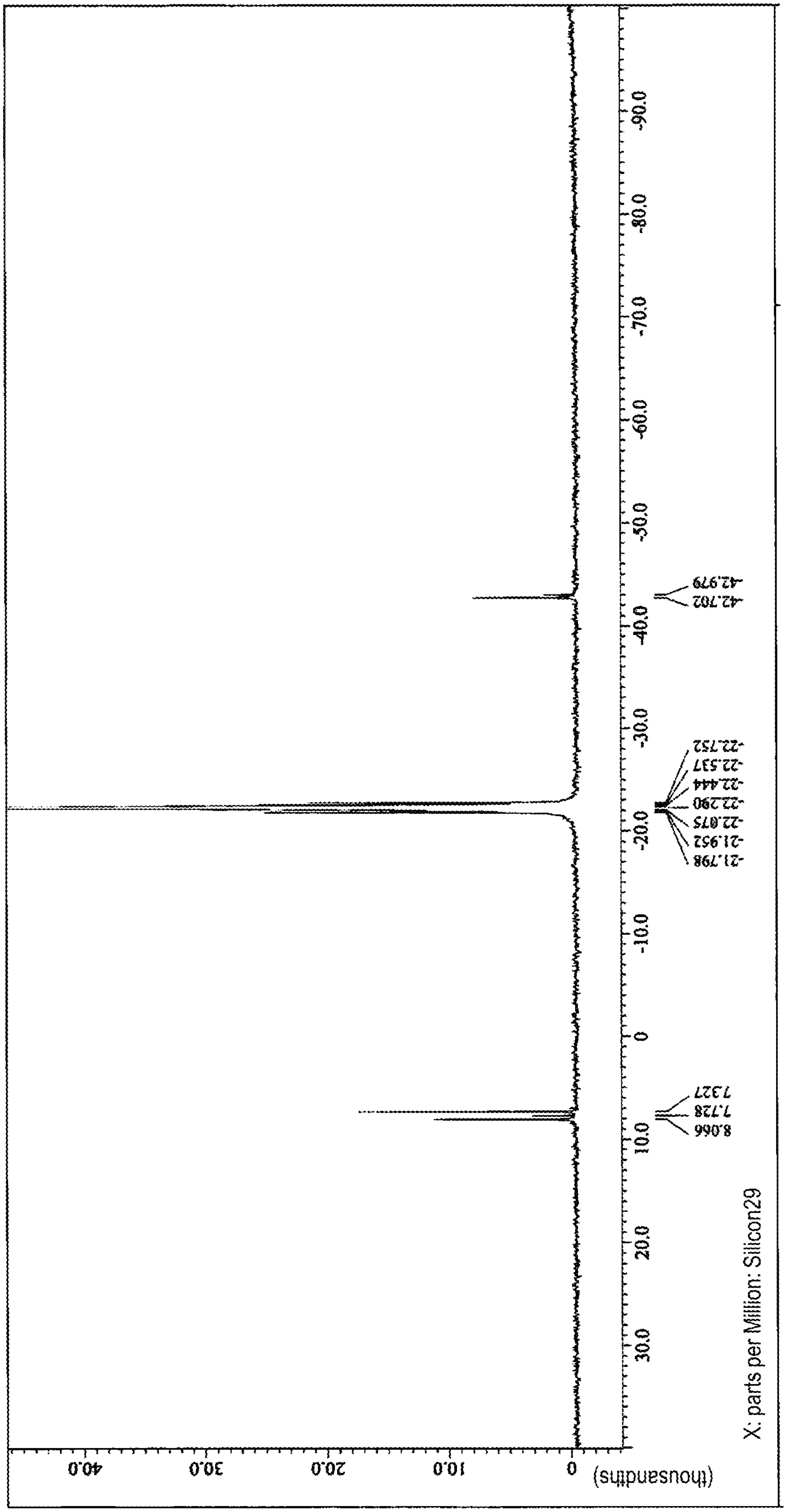
FIG. 3 is the $^{29}$Si-NMR spectrum of the slightly yellow transparent liquid obtained in Synthesis Example 3.
Figure 6:
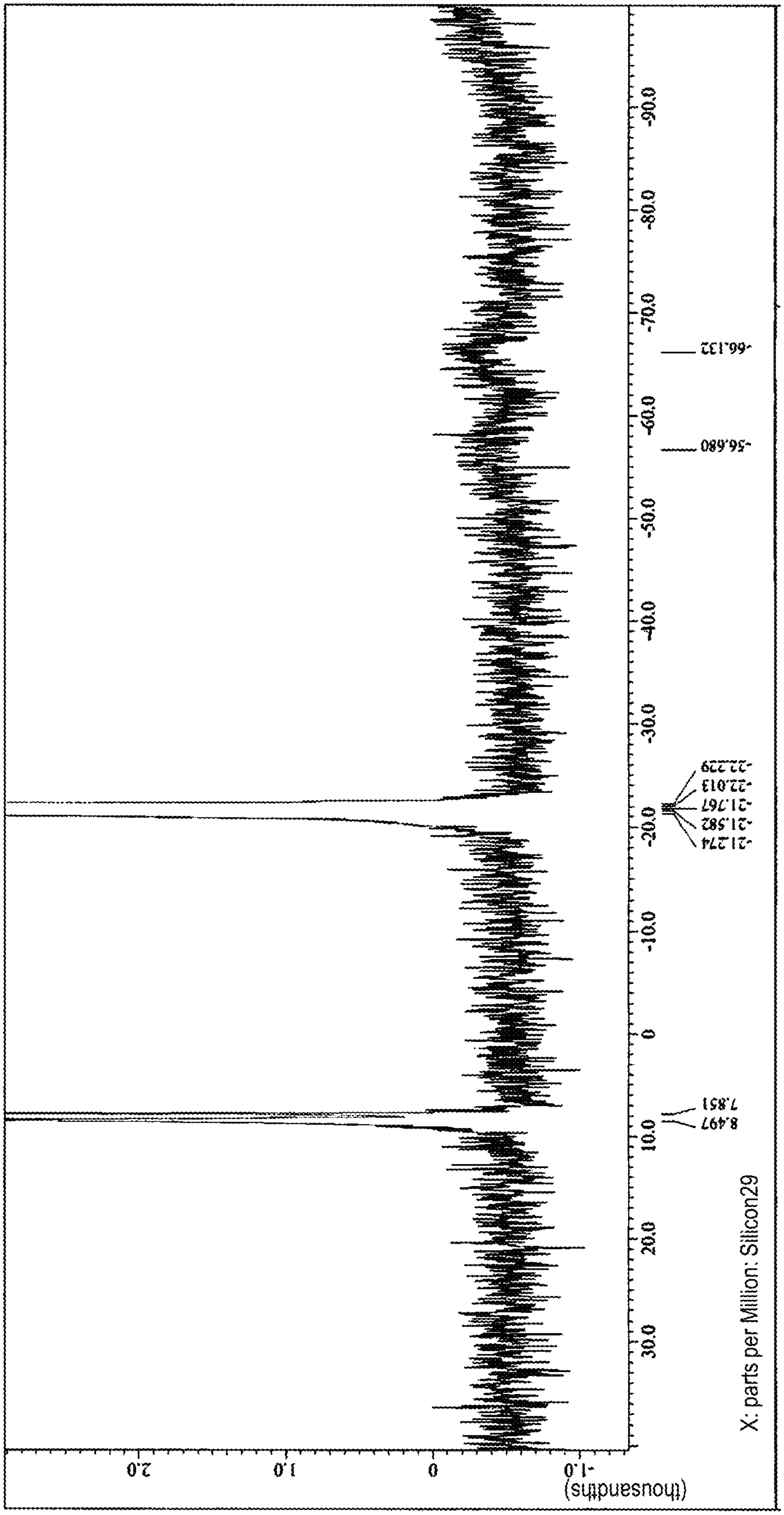
FIG. 6 is the $^{29}$Si-NMR spectrum of the colorless transparent liquid obtained in Synthesis Example 6.

FIG. 6 shows the $^{29}$Si-NMR spectrum of the colorless transparent liquid obtained in Synthesis Example 6, and FIG. 2 shows the $^{29}$Si-NMR spectrum of the polydimethylsiloxane having trimethoxysilyl at one end used in Synthesis Example 6. In the $^{29}$Si-NMR spectrum of FIG. 6, the peaks of −42.5 ppm to −42.2 ppm coming from the T units of the polydimethylsiloxane having trimethoxysilyl at one end disappeared, and broad peaks at −56.7 ppm and −66.1 ppm were newly confirmed.

Based on the above analysis results, the obtained colorless transparent liquid was determined to be an organopolysiloxane having a partial structure where T structural units were contiguously linked and having a number average molecular weight of 28000.

Synthesis Example 7: Synthesis of an Organopolysiloxane Having a Partial Structure where T Structural Units are Contiguously Linked and Having a Mn of 88500

Into a 100 ml three-necked flask equipped with a stirrer, a thermometer and a reflux condenser, 30 g of a polydimethylsiloxane having trimethoxysilyl at one end (Mn=16900, Mw=17600, Mw/Mn=1.04) and 11 mg of tetra (2-ethylhexyl) titanate (by FUJIFILM Wako Pure Chemical Corporation; molecular weight=564.8) were weighed, the temperature was raised under stirring in a nitrogen atmosphere, and the mixture was stirred at 60-70° C. for 4 hours. Then, a liquid obtained by mixing 0.72 g of water in 10 g of tetrahydrofuran was fed at 70° C. over 5 minutes, and the mixture was stirred at 60° C. for 2 hours. Subsequently, tetra(2-ethylhexyl) titanate was added 5 times over 22 hours in a total amount of 681 mg at 60-70° C.

After cooling to room temperature, the reaction solution was transferred to a separatory funnel, added with 20 g of normal hexane and 20 g of water, shaken and allowed to stand. After the mixture was confirmed to separate into two layers, the lower aqueous layer was extracted from the separatory funnel. Further, an operation, in which 50 g of water was added to the separatory funnel, the mixture was shaken and allowed to stand still, and, after the mixture was confirmed to separate into two layers, the lower aqueous layer was extracted from the separatory funnel, was performed twice.

The 52 g of oil layer remaining in the separatory funnel was transferred to a 100 ml two-necked flask equipped with a stirrer, a thermometer, a collection flask and a distillation head, and was heated at 25° C. for 2 hours under a reduced pressure of 0.3 kPaA made by using a vacuum pump to distill off the volatile substances remaining in the product, thus obtaining 21 g of a yellow transparent liquid remaining in the flask.

GPC: Mn=85500, Mw=150000, Mw/Mn=1.69. $^{29}$Si-NMR: δ (ppm); 7.9 to 8.6 (M), −22.0 to −21.5 (D).

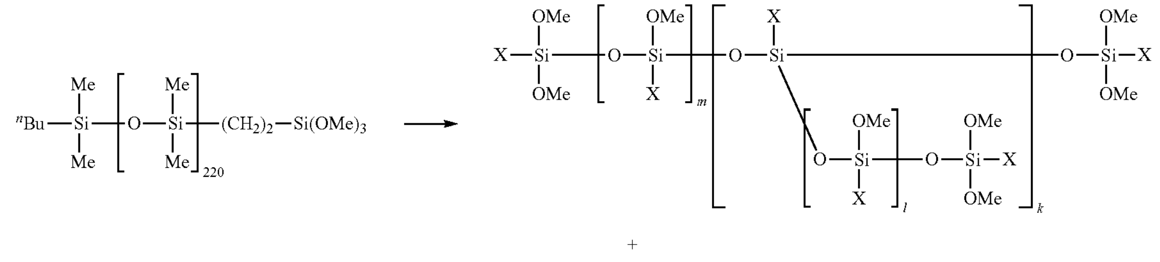

-continued

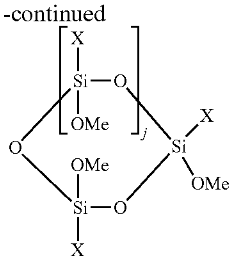

X =

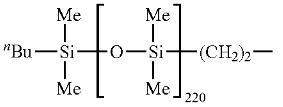

Figure 4:
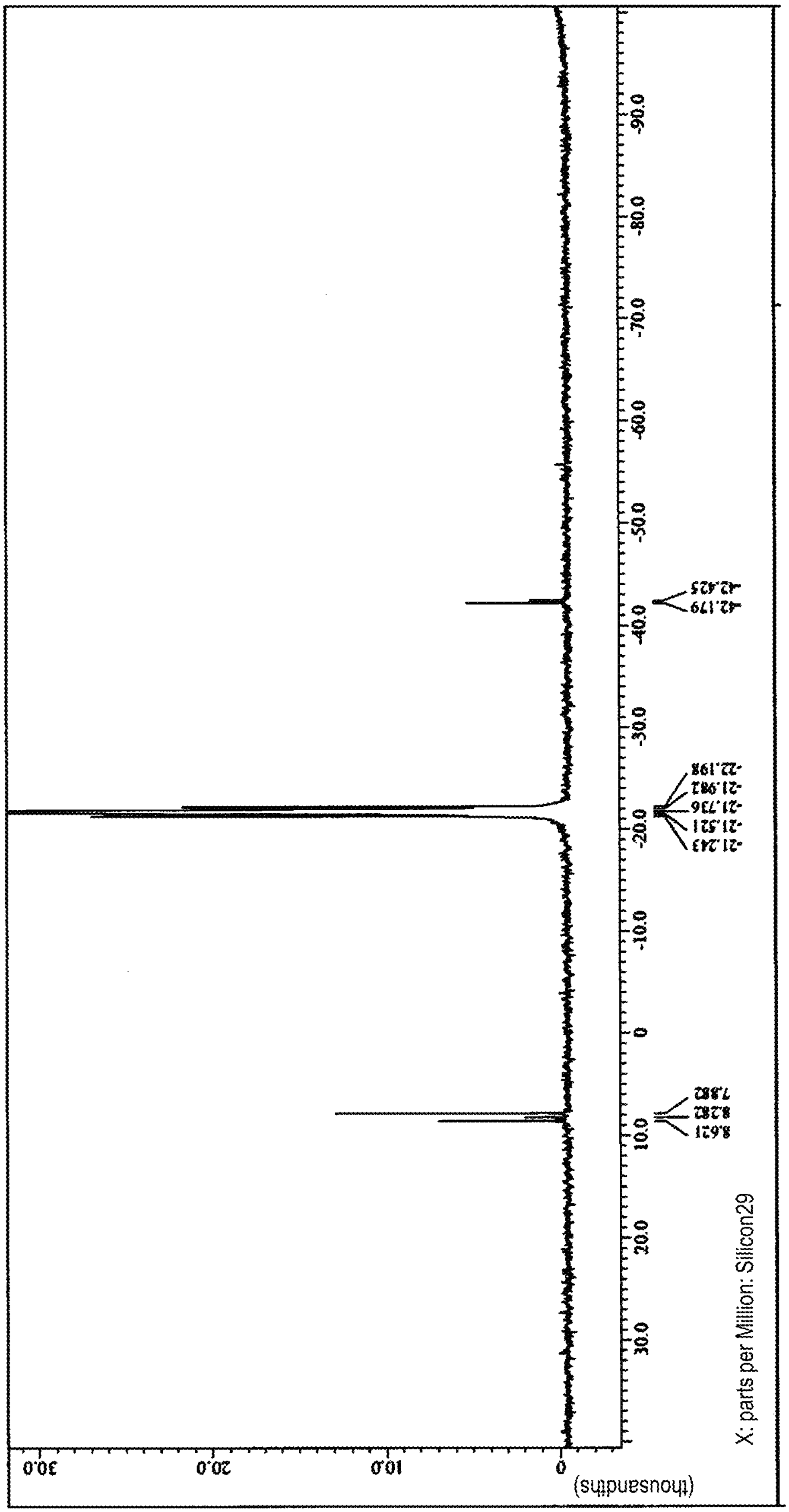
FIG. 4 is the $^{29}$Si-NMR spectrum of the polydimethylsiloxane having trimethoxysilyl at one end used in Synthesis Example 7, which was the slightly yellow transparent liquid obtained in Synthesis Example 4.
Figure 11:
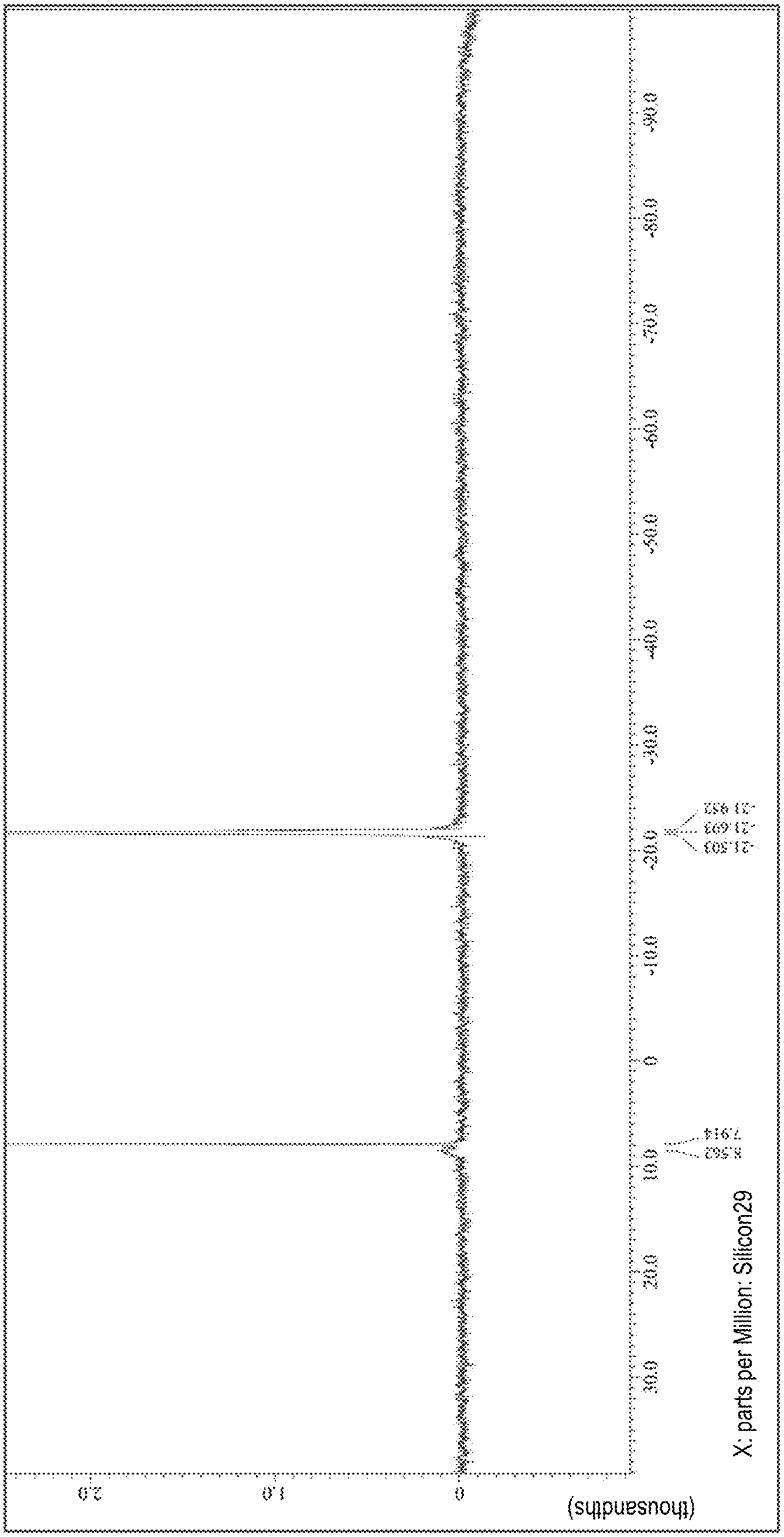
FIG. 11 is the $^{29}$Si-NMR spectrum of the yellow transparent liquid obtained in Synthesis Example 7.

FIG. 11 shows the $^{29}$Si-NMR spectrum of the yellow transparent liquid obtained in Synthesis Example 7, and FIG. 4 shows the $^{29}$Si-NMR spectrum of the polydimethylsiloxane having trimethoxysilyl at one end used in Synthesis Example 7. In the $^{29}$Si-NMR spectrum of FIG. 11, the peaks of −42.4 ppm to −42.2 ppm coming from the T units of the polydimethylsiloxane having trimethoxysilyl at one end were confirmed to disappear.

Based on the above analysis results, the obtained slightly yellow transparent liquid was determined to be an organopolysiloxane having a partial structure where T structural units were contiguously linked and having a number average molecular weight of 85500.

Synthesis Example 8: Synthesis of an Organopolysiloxane Having an Alkoxysilyl at One End and Having a Molecular Weight of 561

Into a 500 ml four-necked flask equipped with a stirrer, a pressure equalizing dropping funnel, a thermometer and a reflux condenser, 300 g of a polydimethylsiloxane having hydrosilyl at one end (molecular weight=412.9) and 26 g of vinyltrimethoxysilane (S210 by JNC; molecular weight=148.2) were weighed, and the temperature was raised to 70° C. under stirring in a nitrogen atmosphere. After reaching 70° C., 1 μL of Pt-VTSC-3.0X produced by Umicore Japan company was added as a Karstedt catalyst. 129 g of vinyltrimethoxysilane was then weighed into the pressure-equalizing dropping funnel and added dropwise to the reaction solution over 10 minutes, and the mixture was stirred at 70° C. for 1 hour. Further, 1 μL of Pt-VTSC-3.0X was added at 70° C., the mixture was stirred at 85° C. for 2 hours and then cooled to room temperature, and the reflux condenser was replaced by a distillation head with a collection flask. Next, the product was heated at 100° C. under a reduced pressure of 2.0 kPaA made by using a vacuum pump to distill off the volatile substances remaining in the product. Then, by further heating at 100° C. under a reduced pressure of 0.1 kPaA to distill off volatile substances remaining in the product, 405 g of a colorless transparent liquid was obtained as a polydimethylsiloxane having trimethoxysilyl at one end (molecular weight=561.1).

$^{29}$Si-NMR: δ (ppm); 7.7 to 9.6 (M), −22.2 to −20.9 (D), −42.3 to −42.0 (T).

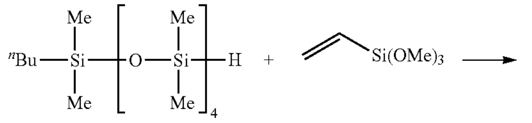

-continued

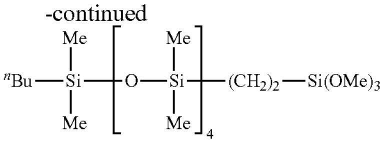

Synthesis Example 9: Synthesis of an Organopolysiloxane Having a Partial Structure where T Structural Units are Contiguously Linked and Having a Mn of 4400

Into a 300 ml four-necked flask equipped with a stirrer, a pressure equalizing dropping funnel, a thermometer and a reflux condenser, 100 g of a polydimethylsiloxane having trimethoxysilyl at one end (molecular weight=561) and 0.3 g of tetra(t-butyl) titanate (by Matsumoto Fine Chemical Co., Ltd.; molecular weight=340.4) were weighed, the temperature was raised under stirring in a nitrogen atmosphere, and the mixture was stirred at 80° C. for 30 minutes. Then, a liquid obtained by mixing 31 g of water in 40 g of N,N-dimethylformamide was fed at 65° C. over 3 hours, and the mixture was stirred at 90° C. for 7 hours.

After cooling to room temperature, the reflux condenser was replaced with a distillation head with a collection flask. Next, the product was heated at 100° C. under a reduced pressure of 5.0 kPaA made by using a vacuum pump to distill off the volatile substances remaining in the product. Then, the product was further heated at 125° C. under a reduced pressure of 0.1 kPaA to distill off the volatile substances remaining in the product. The white suspension remaining in the flask was transferred to a stainless steel holder equipped with a filtration filter having a filtration accuracy of 3 μm, and filtered under nitrogen pressurization to obtain 72 g of a colorless transparent liquid.

GPC: Mn=4400, Mw=4600, Mw/Mn=1.05. $^{29}$Si-NMR: δ (ppm); 10.6 to 11.0 (M), −19.4 to −18.7 (D), −55.1 (T), −64.7 (T).

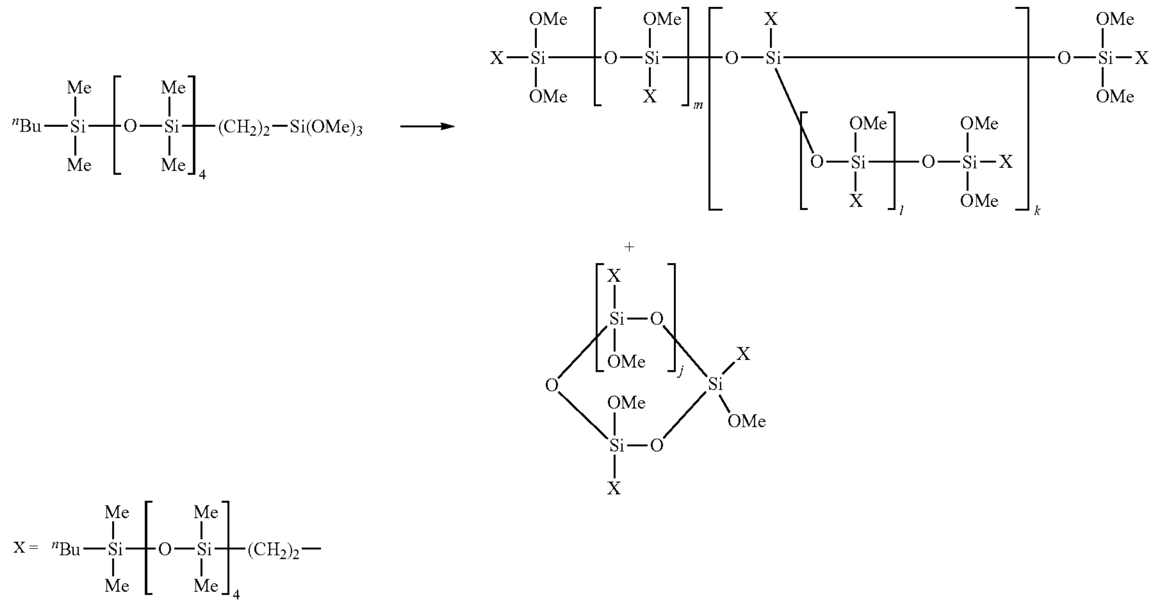

Figure 12:
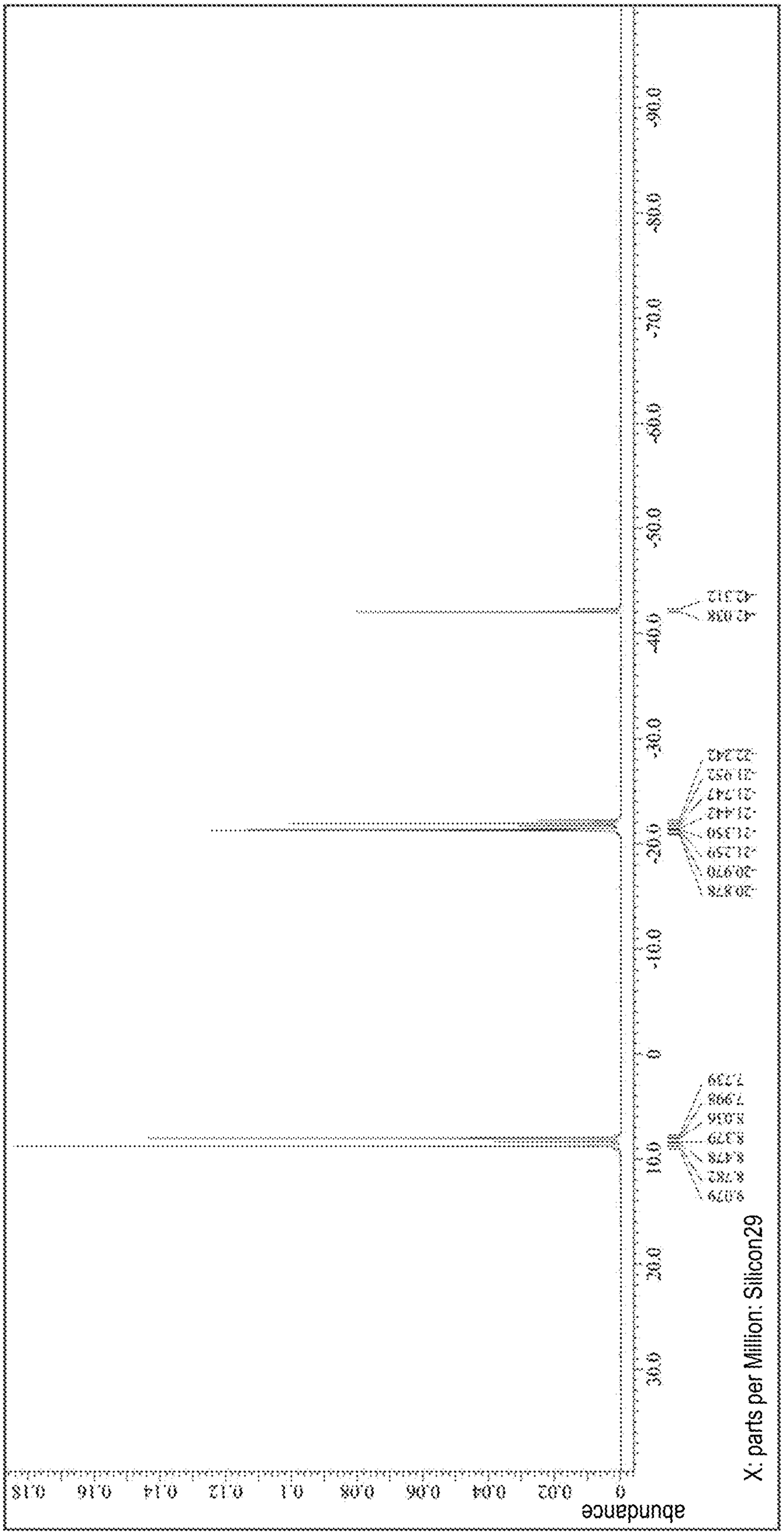
FIG. 12 is the $^{29}$Si-NMR spectrum of the polydimethylsiloxane having trimethoxysilyl at one end used in Synthesis Example 9, which was the colorless transparent liquid obtained in Synthesis Example 8.
Figure 13:
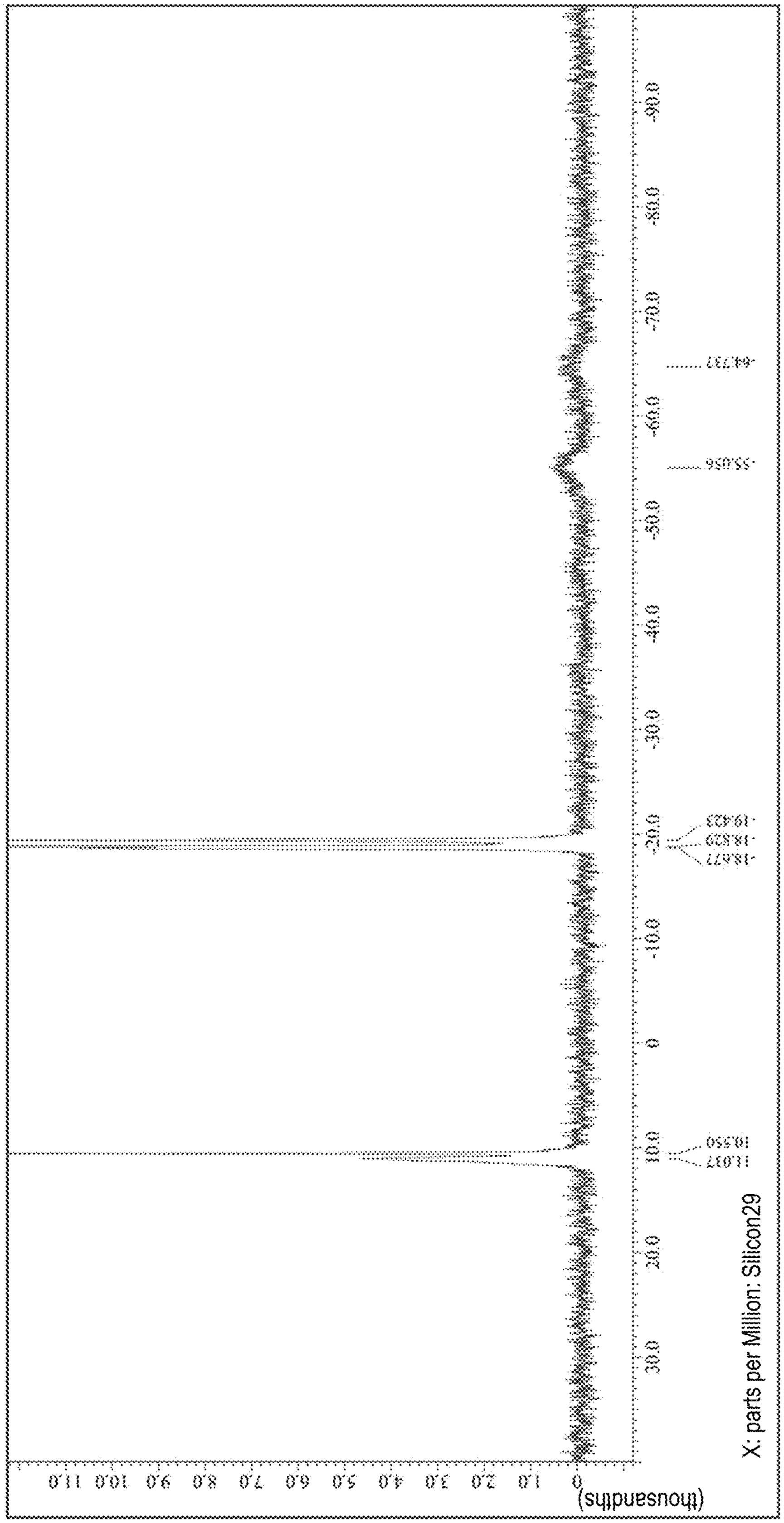
FIG. 13 is the $^{29}$Si-NMR spectrum of the colorless transparent liquid obtained in Synthesis Example 9.

FIG. 13 shows the $^{29}$Si-NMR spectrum of the colorless transparent liquid obtained in Synthesis Example 9, and FIG. 12 shows the $^{29}$Si-NMR spectrum of the polydimethylsiloxane having trimethoxysilyl at one end used in Synthesis Example 9. In the $^{29}$Si-NMR spectrum of FIG. 13, the peaks of −42.3 ppm to −42.0 ppm coming from the T units of the polydimethylsiloxane having trimethoxysilyl at one end disappeared, and broad peaks at −55.1 ppm and −64.7 ppm were newly confirmed.

Based on the above analysis results, the obtained colorless transparent liquid was determined to be an organopolysiloxane having a partial structure where T structural units were contiguously linked and having a number average molecular weight of 4400.

Synthesis Example 10: Synthesis of an Organopolysiloxane Having a Partial Structure where T Structural Units are Contiguously Linked and Having a Mn of 6700 by Reacting a Polydimethylsiloxane Having Trimethoxysilyl at One End and Hexyltriethoxysilane Into a 500 ml four-necked flask equipped with a stirrer, a pressure equalizing dropping funnel, a thermometer and a reflux condenser, 90 g of a polydimethylsiloxane having trimethoxysilyl at one end (Mn=1500, Mw=1700, Mw/Mn=1.14), 79 g of hexyltriethoxysilane (Tokyo Chemical Industry Co. Ltd.; molecular weight=248.4), and 10 g of tetra(2-ethylhexyl) titanate (FUJIFILM Wako Pure Chemical Corporation; molecular weight=564.8) were weighed, the temperature was raised under stirring in a nitrogen atmosphere, and the mixture was stirred at 80° C. for 30 minutes. Then, a liquid obtained by mixing 72 g of water in 90 g of N,N-dimethylformamide was fed at 80° C. over 3 hours, and the mixture was stirred at 90° C. for 7 hours.

After cooling to room temperature, the reflux condenser was replaced with a distillation head with a collection flask. Next, the product was heated at 100° C. under a reduced pressure of 5.0 kPaA made by using a vacuum pump to distill off the volatile substances remaining in the product. Then, the product was further heated at 125° C. under a reduced pressure of 0.1 kPaA to distill off the volatile substances remaining in the product. The yellow suspension remaining in the flask was transferred to a stainless steel holder equipped with a filtration filter having a filtration accuracy of 3 μm, and filtered under nitrogen pressurization to obtain 130 g of a yellow transparent liquid.

GPC: Mn=6700, Mw=9300, Mw/Mn=1.39. $^{29}$Si-NMR: δ (ppm); 7.9 to 8.5 (M), −22.0 to −21.3 (D).

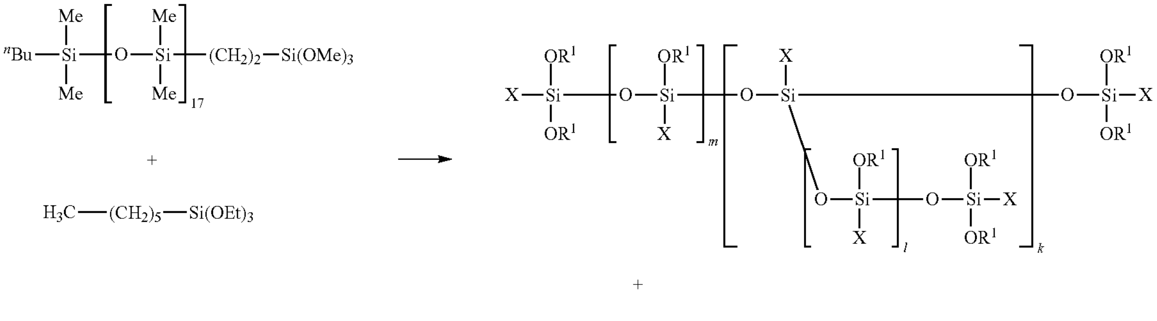

-continued

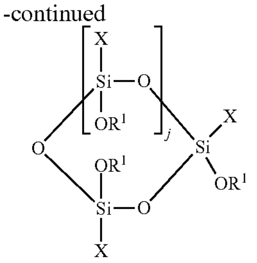

$R^1$ = Me or Et

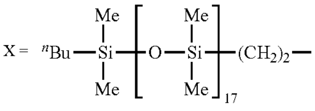

or $H_3C—(CH_2)_5—$

Figure 14:
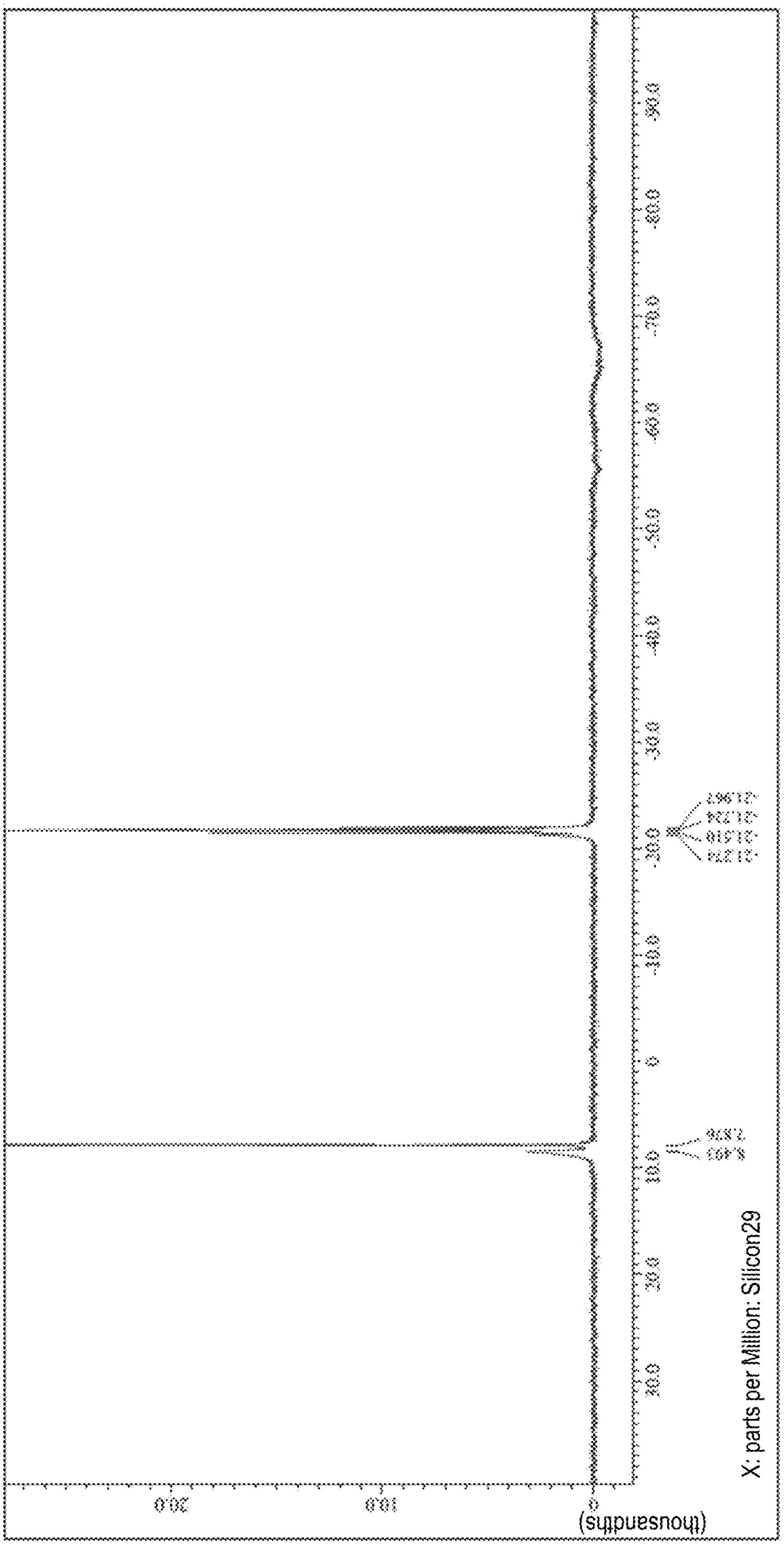
FIG. 14 is the $^{29}$Si-NMR spectrum of the yellow transparent liquid obtained in Synthesis Example 10.

FIG. 14 shows the $^{29}$Si-NMR spectrum of the yellow transparent liquid obtained in Synthesis Example 10, and FIG. 1 shows the $^{29}$Si-NMR spectrum of the polydimethylsiloxane having trimethoxysilyl at one end used in Synthesis Example 10. In the $^{29}$Si-NMR spectrum of FIG. 14, the peaks of −41.2 ppm to −40.8 ppm coming from the T units of the polydimethylsiloxane having trimethoxysilyl at one end were confirmed to disappear.

Based on the above analysis results, the obtained yellow transparent liquid was determined to be an organopolysiloxane having a partial structure where T structural units were contiguously linked and having a number average molecular weight of 6700.

Synthesis Example 11: Synthesis of an Organopolysiloxane Having a Partial Structure where T Structural Units are Contiguously Linked and Having a Mn of 6200 by Reacting a Polydimethylsiloxane Having Trimethoxysilyl at One End and Phenyltriethoxysilane Into a 500 ml four-necked flask equipped with a stirrer, a pressure equalizing dropping funnel, a thermometer and a reflux condenser, 90 g of a polydimethylsiloxane having trimethoxysilyl at one end (Mn=1500, Mw=1700, Mw/Mn=1.14), 77 g of phenyltriethoxysilane (by Tokyo Chemical Industry Co. Ltd.; molecular weight=240.4), and 10 g of tetra(2 -ethylhexyl) titanate (by FUJIFILM Wako Pure Chemical Corporation; molecular weight=564.8) were weighed, the temperature was raised under stirring in a nitrogen atmosphere, and the mixture was stirred at 80° C. for 30 minutes. Thereafter, a liquid obtained by mixing 72 g of water in 90 g of N,N-dimethylformamide was fed at 80° C. over 3 hours, and the mixture was stirred at 90° C. for 7 hours.

After cooling to room temperature, the reflux condenser was replaced with a distillation head with a collection flask. Next, the product was heated at 100° C. under a reduced pressure of 5.0 kPaA made by using a vacuum pump to distill off the volatile substances remaining in the product. Then, the product was further heated at 125° C. under a reduced pressure of 0.1 kPaA to distill off the volatile substances remaining in the product. The yellow suspension remaining in the flask was transferred to a stainless steel holder equipped with a filtration filter having a filtration accuracy of 3 μm, and filtered under nitrogen pressurization to obtain 125 g of a yellow transparent liquid.

GPC: Mn=6200, Mw=7900, Mw/Mn=1.28. $^{29}$Si-NMR: δ (ppm); 7.8 to 8.3 (M), −22.0 to −21.6 (D).

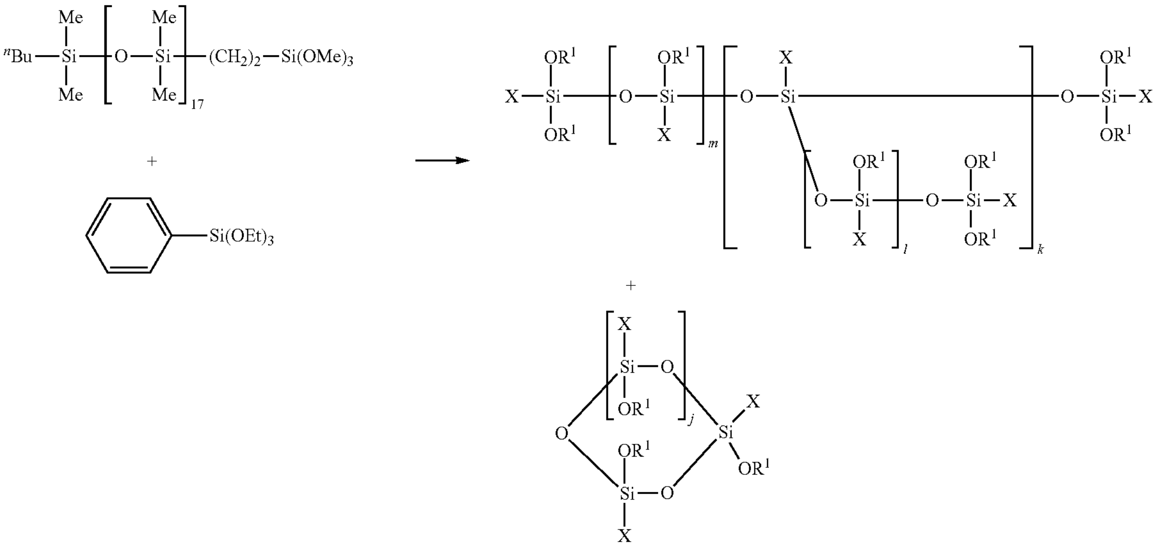

-continued $R^1$ = Me or Et

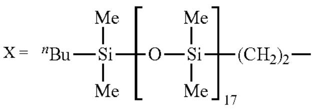

or

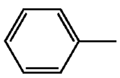

Figure 15:
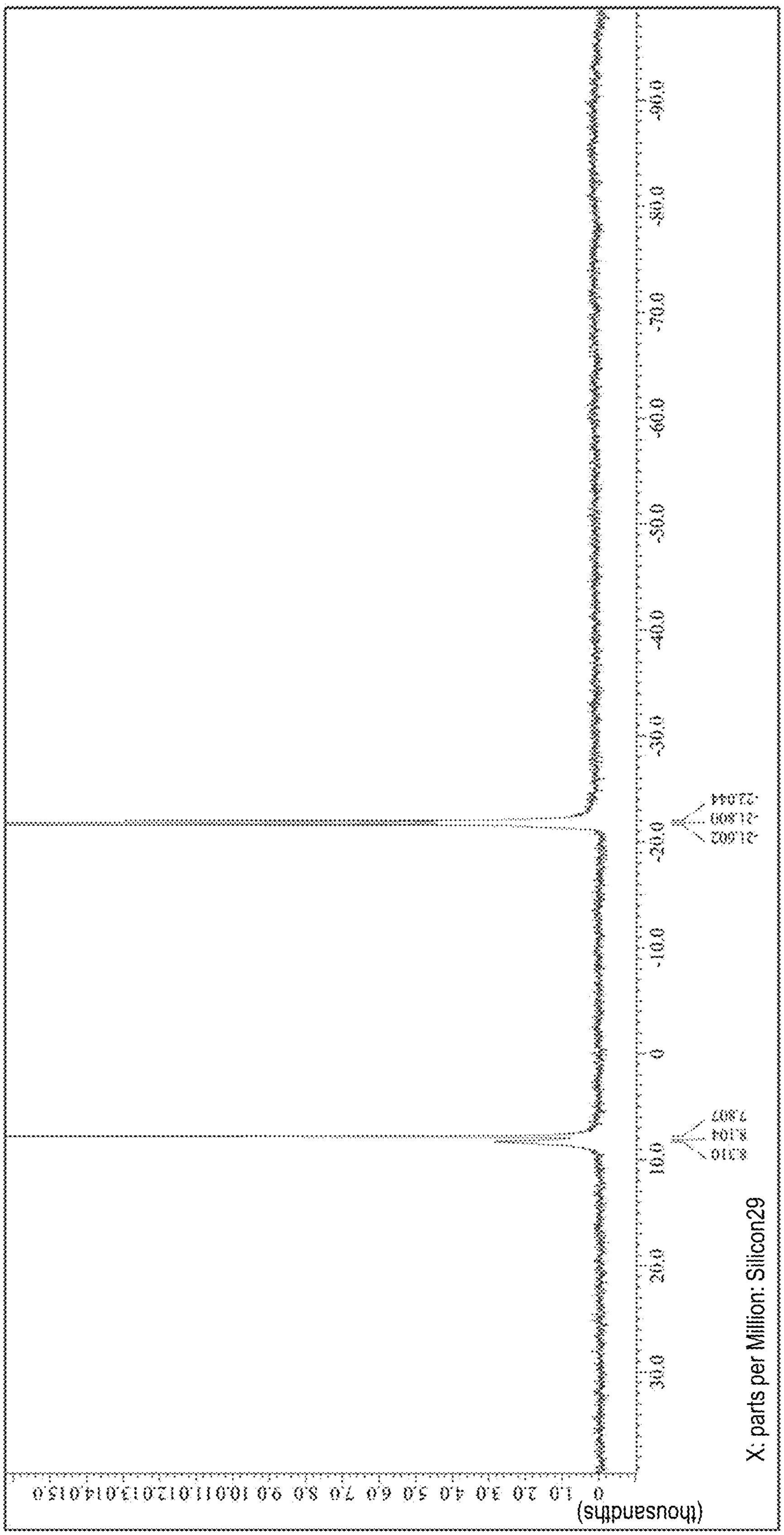
FIG. 15 is the $^{29}$Si-NMR spectrum of the yellow transparent liquid obtained in Synthesis Example 11.

FIG. 15 shows the $^{29}$Si-NMR spectrum of the yellow transparent liquid obtained in Synthesis Example 11, and FIG. 1 shows the $^{29}$Si-NMR spectrum of the polydimethylsiloxane having trimethoxysilyl at one end used in Synthesis Example 11. In the $^{29}$Si-NMR spectrum of FIG. 15, the peaks of −41.2 ppm to −40.8 ppm coming from the T units of the polydimethylsiloxane having trimethoxysilyl at one end were confirmed to disappear.

Based on the above analysis results, the obtained yellow transparent liquid was determined to be an organopolysiloxane having a partial structure where T structural units were contiguously linked and having a number average molecular weight of 6200.

Synthesis Example 12: Synthesis of an Organopolysiloxane Having a Partial Structure where T Structural Units are Contiguously Linked and Having a Mn of 8100 by Reacting a Polydimethylsiloxane Having Trimethoxysilyl at One End and 3-Methacryloxypropyltriethoxysilane Into a 300 ml four-necked flask equipped with a stirrer, a pressure equalizing dropping funnel, a thermometer and a reflux condenser, 45 g of a polydimethylsiloxane having weight=290.4), and 0.7 g of tetra(t-butyl) titanate (by Matsumoto Fine Chemical Co., Ltd.; molecular weight=340.4) were weighed, the temperature was raised under stirring in a nitrogen atmosphere, and the mixture was stirred at 80° C. for 30 minutes. Thereafter, a liquid obtained by mixing 46 g of water in 40 g of N,N-dimethylformamide was fed at 80° C. over 3 hours, and the mixture was stirred at 90° C. for 7 hours.

After cooling to room temperature, the reflux condenser was replaced with a distillation head with a collection flask. Next, the product was heated at 100° C. under a reduced pressure of 5.0 kPaA made by using a vacuum pump to distill off the volatile substances remaining in the product. Then, the product was further heated at 100° C. under a reduced pressure of 0.1 kPaA to distill off the volatile substances remaining in the product. The yellow suspension remaining in the flask was transferred to a stainless steel holder equipped with a filtration filter having a filtration accuracy of 3 μm, and filtered under nitrogen pressurization to obtain 66 g of a yellow transparent liquid.

GPC: Mn=8100, Mw=10600, Mw/Mn=1.32. $^{29}$Si-NMR: δ (ppm); 7.9 to 8.6 (M), −22.0 to −21.2 (D).

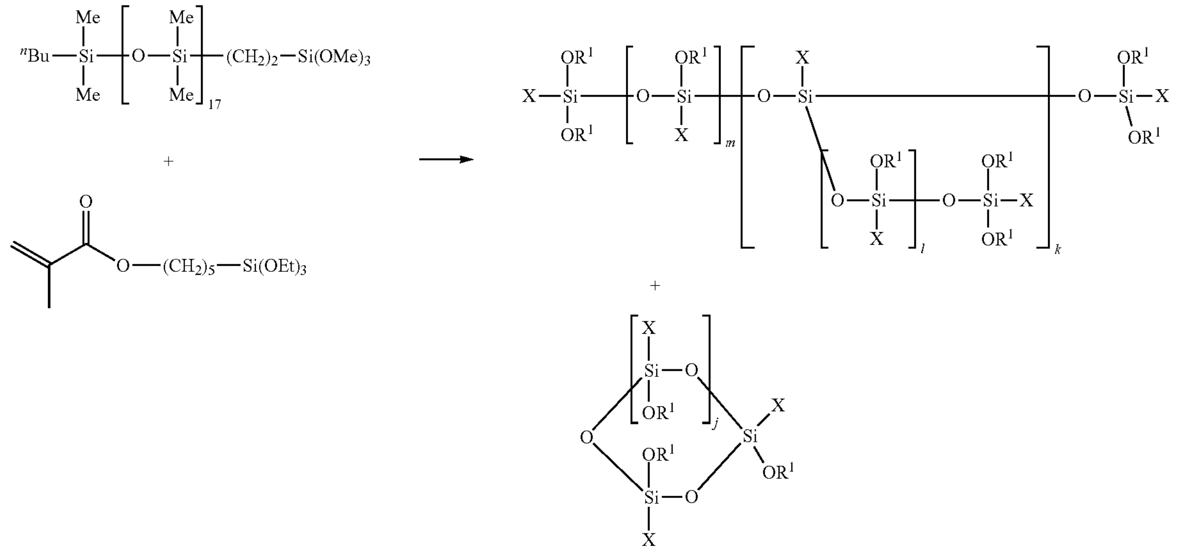

$R^1$ = Me or Et

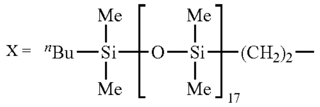

or

Figure 16:
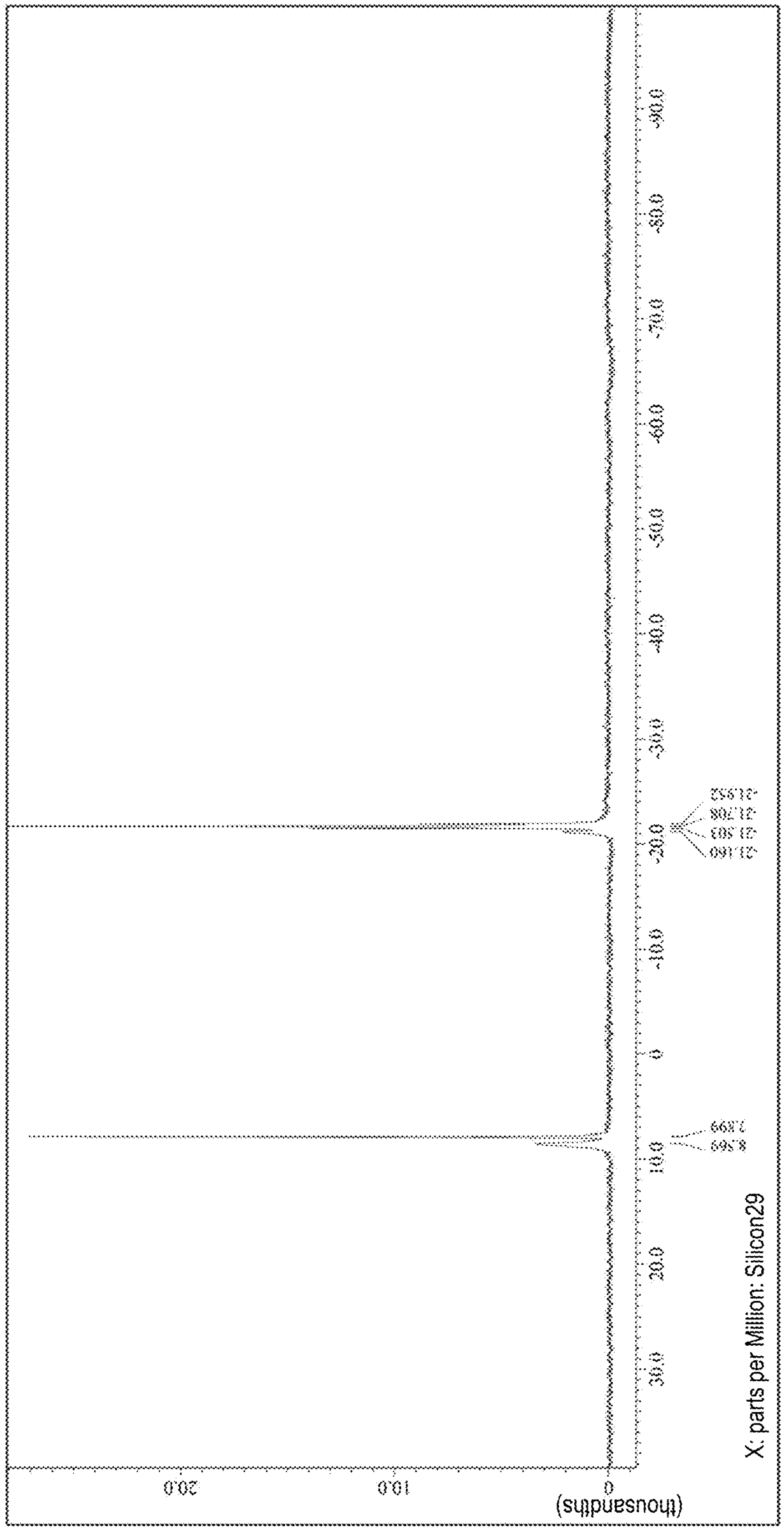
FIG. 16 is the $^{29}$Si-NMR spectrum of the yellow transparent liquid obtained in Synthesis Example 12.

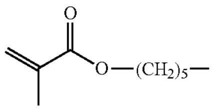

trimethoxysilyl at one end (Mn=1500, Mw=1700, Mw/Mn=1.14), 46 g of 3-methacryloxypropyltriethoxysilane (by Tokyo Chemical Industry Co., Ltd.; molecular FIG. 16 shows the $^{29}$Si-NMR spectrum of the yellow transparent liquid obtained in Synthesis Example 12, and FIG. 1 shows the $^{29}$Si-NMR spectrum of the polydimethylsiloxane having trimethoxysilyl at one end used in Synthesis Example 12. In the $^{29}$Si-NMR spectrum of FIG. 16, the peaks of −41.2 ppm to −40.8 ppm coming from the T units of the polydimethylsiloxane having trimethoxysilyl at one end were confirmed to disappear.

Based on the above analysis results, the obtained yellow transparent liquid was determined to be an organopolysiloxane having a partial structure where T structural units were contiguously linked and having a number average molecular weight of 8100.

<Preparations 1 to 2 of Samples for Dispersibility Evaluation>

Into an ointment pot container, a polydimethylsiloxane (KF-96-1000CS produced by Shin-Etsu Chemical Co., Ltd.) being a silicone oil as a liquid medium, and an organopolysiloxane synthesized in Synthesis Examples 1 to 7 and Synthesis Examples 9 to 10 as a dispersant were weighed. Further, as a dispersoid, aluminum oxide (DAW-10 produced by Denka Company Limited) having an average diameter of 13 μm was weighed into the same, and the mixture was stirred with a spatula. KF-96-1000CS, the organopolysiloxanes synthesized in Synthesis Examples 1-7 and Synthesis Examples 9-10, and the aluminum oxide were weighed so as to have the blending amounts shown in Tables 1 to 4. Next, a defoaming Rentaro Mixer of vacuum type (model: ARV-310) of THINKY Corporation was used to knead at 2000 rpm under the normal pressure for 1 minute and at 2000 rpm under a reduced pressure for 1 minute to prepare a sample for dispersibility evaluation.

<Dispersibility Evaluations 1 to 2>

The dispersibility evaluation samples prepared as above were evaluated for dispersibility by measuring the shear viscosities at different shear rates under the following conditions using a rheometer (MCR302 made by Anton Paar company).

Plate shape: circular flat plate of 25 mmϕ

Sample thickness: 1 mm

Temperature: 25±1° C.

Shear rate: 0.01 to 100 $s^{-1}$

Figure 7:
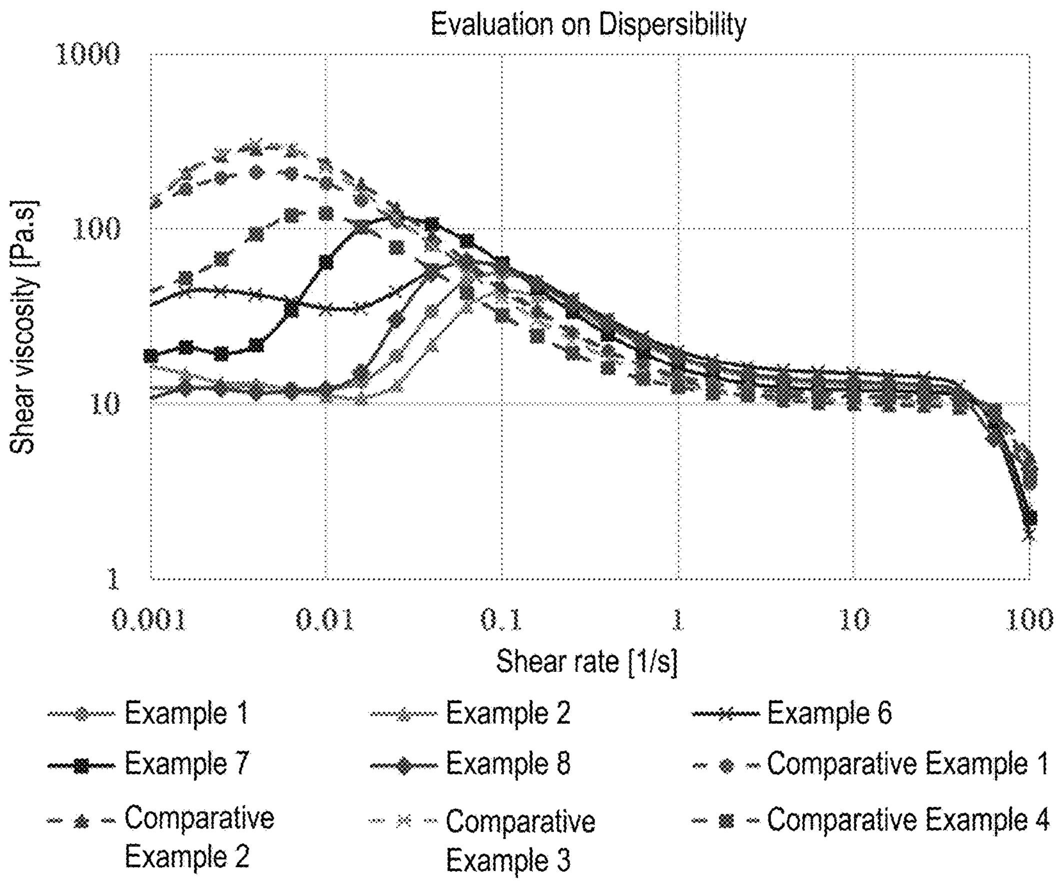
FIG. 7 is a graph showing the variation of the shear viscosity with the shear rate for the silicone dispersants of Examples 1-2, Examples 6-8 and Comparative Examples 1-4.

In Examples 1-2 and Examples 6-8, as shown in Tables 1 to 4, the organopolysiloxanes having a partial structure where T structural units are contiguously linked as synthesized in Synthesis Examples 5-7 and Synthesis Examples 9-10 were used as dispersants and evaluated by measuring the shear viscosities at different shear rates. In Comparative Examples 1-4, as shown in Tables 1 to 4, the organopolysiloxanes having an alkoxysilyl at one end as synthesized in Synthesis Examples 1 to 4 were used as dispersants and evaluated by measuring the shear viscosities at different shear rates. The results are shown in Tables 1 to 4 and FIG. 7.

TABLE 1

Dispersibility evaluation result 1-1

| | Dispersant | KF-96-1000CS | Dispersant | Aluminum oxide | Dispersibility Shear viscosity [Pa · s] | Dispersibility Shear rate [1/s] |
|---|---|---|---|---|---|---|
| Example 1 | Synthesis Example 5 | 26 parts by mass | 1 part by mass | 100 parts by mass | 12.4 | (0.001) |
| Example 2 | Synthesis Example 6 | 26 parts by mass | 1 part by mass | 100 parts by mass | 16.4 | (0.001) |
| Example 6 | Synthesis Example 7 | 26 parts by mass | 1 part by mass | 100 parts by mass | 36.9 | (0.001) |
| Example 7 | Synthesis Example 9 | 26 parts by mass | 1 part by mass | 100 parts by mass | 18.8 | (0.001) |
| Example 8 | Synthesis Example 10 | 26 parts by mass | 1 part by mass | 100 parts by mass | 10.8 | (0.001) |
| Comparative Example 1 | Synthesis Example 1 | 26 parts by mass | 1 part by mass | 100 parts by mass | 131 | (0.001) |
| Comparative Example 2 | Synthesis Example 2 | 26 parts by mass | 1 part by mass | 100 parts by mass | 133 | (0.001) |
| Comparative Example 3 | Synthesis Example 3 | 26 parts by mass | 1 part by mass | 100 parts by mass | 147 | (0.001) |
| Comparative Example 4 | Synthesis Example 4 | 26 parts by mass | 1 part by mass | 100 parts by mass | 44.1 | (0.001) |

TABLE 2

Dispersibility evaluation result 1-2

| | Dispersant | KF-96-1000CS | Dispersant | Aluminum oxide | Dispersibility Shear viscosity [Pa · s] | Dispersibility Shear rate [1/s] |
|---|---|---|---|---|---|---|
| Example 1 | Synthesis Example 5 | 26 parts by mass | 1 part by mass | 100 parts by mass | 12.3 | (0.01) |
| Example 2 | Synthesis Example 6 | 26 parts by mass | 1 part by mass | 100 parts by mass | 11.2 | (0.01) |
| Example 6 | Synthesis Example 7 | 26 parts by mass | 1 part by mass | 100 parts by mass | 35.2 | (0.01) |
| Example 7 | Synthesis Example 9 | 26 parts by mass | 1 part by mass | 100 parts by mass | 65.0 | (0.01) |

TABLE 2-continued

Dispersibility evaluation result 1-2

| | Dispersant | KF-96-1000CS | Dispersant | Aluminum oxide | Dispersibility Shear viscosity [Pa · s] | Dispersibility Shear rate [1/s] |
|---|---|---|---|---|---|---|
| Example 8 | Synthesis Example 10 | 26 parts by mass | 1 part by mass | 100 parts by mass | 12.2 | (0.01) |
| Comparative Example 1 | Synthesis Example 1 | 26 parts by mass | 1 part by mass | 100 parts by mass | 185 | (0.01) |
| Comparative Example 2 | Synthesis Example 2 | 26 parts by mass | 1 part by mass | 100 parts by mass | 240 | (0.01) |
| Comparative Example 3 | Synthesis Example 3 | 26 parts by mass | 1 part by mass | 100 parts by mass | 227 | (0.01) |
| Comparative Example 4 | Synthesis Example 4 | 26 parts by mass | 1 part by mass | 100 parts by mass | 123 | (0.01) |

TABLE 3

Dispersibility evaluation result 1-3

| | Dispersant | KF-96-1000CS | Dispersant | Aluminum oxide | Dispersibility Shear viscosity [Pa · s] | Dispersibility Shear rate [1/s] |
|---|---|---|---|---|---|---|
| Example 1 | Synthesis Example 5 | 26 parts by mass | 1 part by mass | 100 parts by mass | 56.0 | (0.1) |
| Example 2 | Synthesis Example 6 | 26 parts by mass | 1 part by mass | 100 parts by mass | 43.9 | (0.1) |
| Example 6 | Synthesis Example 7 | 26 parts by mass | 1 part by mass | 100 parts by mass | 61.4 | (0.1) |
| Example 7 | Synthesis Example 9 | 26 parts by mass | 1 part by mass | 100 parts by mass | 64.0 | (0.1) |
| Example 8 | Synthesis Example 10 | 26 parts by mass | 1 part by mass | 100 parts by mass | 60.4 | (0.1) |
| Comparative Example 1 | Synthesis Example 1 | 26 parts by mass | 1 part by mass | 100 parts by mass | 44.7 | (0.1) |
| Comparative Example 2 | Synthesis Example 2 | 26 parts by mass | 1 part by mass | 100 parts by mass | 46.9 | (0.1) |
| Comparative Example 3 | Synthesis Example 3 | 26 parts by mass | 1 part by mass | 100 parts by mass | 41.0 | (0.1) |
| Comparative Example 4 | Synthesis Example 4 | 26 parts by mass | 1 part by mass | 100 parts by mass | 32.3 | (0.1) |

TABLE 4

Dispersibility evaluation result 1-4

| | Dispersant | KF-96-1000CS | Dispersant | Aluminum oxide | Dispersibility Shear viscosity [Pa · s] | Dispersibility Shear rate [1/s] |
|---|---|---|---|---|---|---|
| Example 1 | Synthesis Example 5 | 26 parts by mass | 1 part by mass | 100 parts by mass | 18.9 | (1) |
| Example 2 | Synthesis Example 6 | 26 parts by mass | 1 part by mass | 100 parts by mass | 18.2 | (1) |
| Example 6 | Synthesis Example 7 | 26 parts by mass | 1 part by mass | 100 parts by mass | 20.2 | (1) |
| Example 7 | Synthesis Example 9 | 26 parts by mass | 1 part by mass | 100 parts by mass | 16.2 | (1) |
| Example 8 | Synthesis Example 10 | 26 parts by mass | 1 part by mass | 100 parts by mass | 18.7 | (1) |

TABLE 4-continued

| Dispersibility evaluation result 1-4 | | | | | Dispersibility | |
|---|---|---|---|---|---|---|
| | Dispersant | KF-96-1000CS | Dispersant | Aluminum oxide | Shear viscosity [Pa · s] | Shear rate [1/s] |
| Comparative Example 1 | Synthesis Example 1 | 26 parts by mass | 1 part by mass | 100 parts by mass | 14.5 | (1) |
| Comparative Example 2 | Synthesis Example 2 | 26 parts by mass | 1 part by mass | 100 parts by mass | 14.0 | (1) |
| Comparative Example 3 | Synthesis Example 3 | 26 parts by mass | 1 part by mass | 100 parts by mass | 13.3 | (1) |
| Comparative Example 4 | Synthesis Example 4 | 26 parts by mass | 1 part by mass | 100 parts by mass | 12.5 | (1) |

Figure 8:
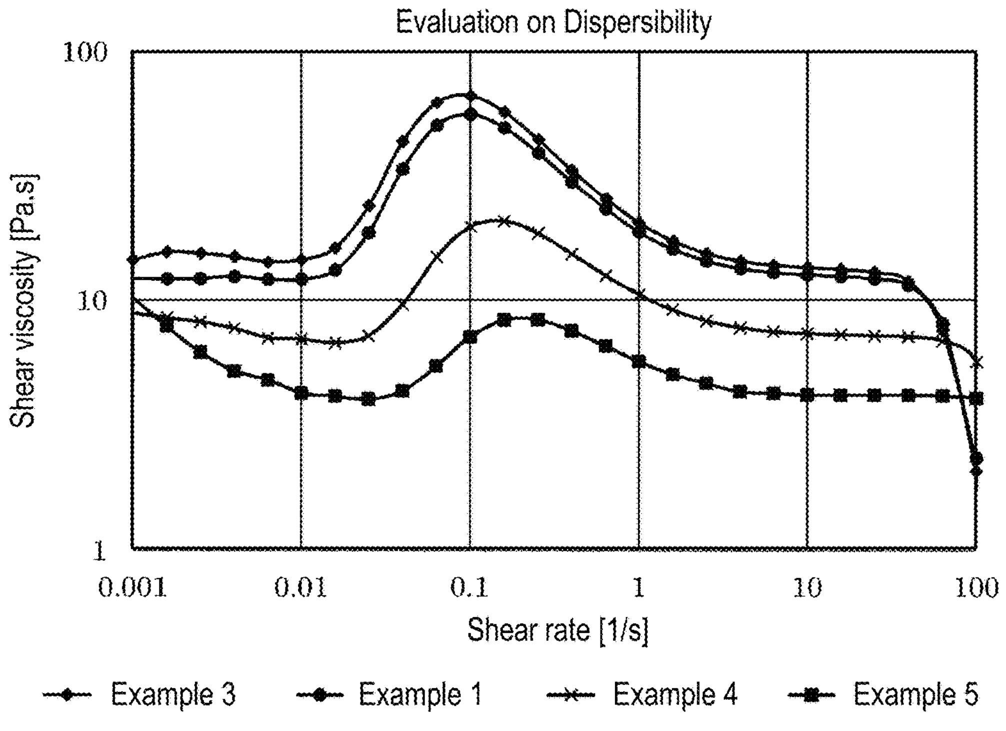
FIG. 8 is a graph showing the variation of the shear viscosity with the shear rate for the silicone dispersants of Example 1 and Examples 3-5.
Figure 9:
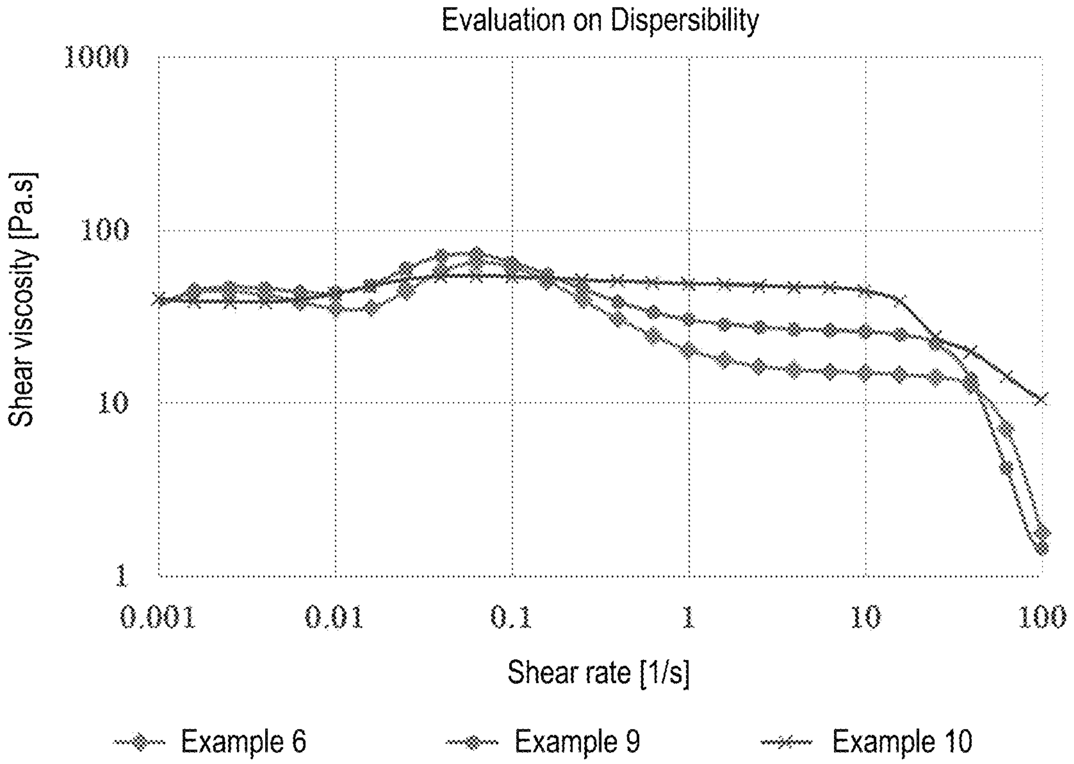
FIG. 9 is a graph showing the variation of the shear viscosity with the shear rate for the silicone dispersants of Example 6 and Examples 9-10.

Further, in Example 1, Examples 3-6 and Examples 9-10, as shown in Tables 5 to 8, the organopolysiloxanes having a partial structure where T structural units are contiguously linked as synthesized in Synthesis Example 5 and Synthesis Example 7 were used as dispersants, the proportion of dispersant was changed, and the shear viscosities at different shear rates were measured for evaluation. The results are shown in Tables 5-8 and FIGS. 8-9.

TABLE 5

| Dispersibility evaluation result 2-1 | | | | | Dispersibility | |
|---|---|---|---|---|---|---|
| | Dispersant | KF-96-1000CS | Dispersant | Aluminum oxide | Shear viscosity [Pa · s] | Shear rate [1/s] |
| Example 3 | Synthesis Example 5 | 26 parts by mass | 0.5 part by mass | 100 parts by mass | 14.6 | (0.001) |
| Example 1 | Synthesis Example 5 | 26 parts by mass | 1 part by mass | 100 parts by mass | 12.4 | (0.001) |
| Example 4 | Synthesis Example 5 | 26 parts by mass | 5 parts by mass | 100 parts by mass | 8.9 | (0.001) |
| Example 5 | Synthesis Example 5 | 26 parts by mass | 10 parts by mass | 100 parts by mass | 10.3 | (0.001) |
| Example 6 | Synthesis Example 7 | 26 parts by mass | 1 part by mass | 100 parts by mass | 36.9 | (0.001) |
| Example 9 | Synthesis Example 7 | 14 parts by mass | 14 parts by mass | 100 parts by mass | 37.5 | (0.001) |
| Example 10 | Synthesis Example 7 | 0 part by mass | 26 parts by mass | 100 parts by mass | 40.0 | (0.001) |

TABLE 6

| Dispersibility evaluation result 2-2 | | | | | Dispersibility | |
|---|---|---|---|---|---|---|
| | Dispersant | KF-96-1000CS | Dispersant | Aluminum oxide | Shear viscosity [Pa · s] | Shear rate [1/s] |
| Example 3 | Synthesis Example 5 | 26 parts by mass | 0.5 part by mass | 100 parts by mass | 14.7 | (0.01) |
| Example 1 | Synthesis Example 5 | 26 parts by mass | 1 part by mass | 100 parts by mass | 12.3 | (0.01) |
| Example 4 | Synthesis Example 5 | 26 parts by mass | 5 parts by mass | 100 parts by mass | 7.0 | (0.01) |
| Example 5 | Synthesis Example 5 | 26 parts by mass | 10 parts by mass | 100 parts by mass | 4.3 | (0.01) |
| Example 6 | Synthesis Example 7 | 26 parts by mass | 1 part by mass | 100 parts by mass | 35.2 | (0.01) |
| Example 9 | Synthesis Example 7 | 14 parts by mass | 14 parts by mass | 100 parts by mass | 43.4 | (0.01) |
| Example 10 | Synthesis Example 7 | 0 part by mass | 26 parts by mass | 100 parts by mass | 43.1 | (0.01) |

TABLE 7

| Dispersibility evaluation result 2-3 | | | | | Dispersibility | |
|---|---|---|---|---|---|---|
| | Dispersant | KF-96-1000CS | Dispersant | Aluminum oxide | Shear viscosity [Pa · s] | Shear rate [1/s] |
| Example 3 | Synthesis Example 5 | 26 parts by mass | 0.5 part by mass | 100 parts by mass | 66.8 | (0.1) |
| Example 1 | Synthesis Example 5 | 26 parts by mass | 1 part by mass | 100 parts by mass | 56.0 | (0.1) |
| Example 4 | Synthesis Example 5 | 26 parts by mass | 5 parts by mass | 100 parts by mass | 19.9 | (0.1) |
| Example 5 | Synthesis Example 5 | 26 parts by mass | 10 parts by mass | 100 parts by mass | 7.2 | (0.1) |

TABLE 7-continued

Dispersibility evaluation result 2-3

| | Dispersant | KF-96-1000CS | Dispersant | Aluminum oxide | Dispersibility Shear viscosity [Pa · s] | Shear rate [1/s] |
|---|---|---|---|---|---|---|
| Example 6 | Synthesis Example 7 | 26 parts by mass | 1 part by mass | 100 parts by mass | 61.4 | (0.1) |
| Example 9 | Synthesis Example 7 | 14 parts by mass | 14 parts by mass | 100 parts by mass | 65.4 | (0.1) |
| Example 10 | Synthesis Example 7 | 0 part by mass | 26 parts by mass | 100 parts by mass | 53.9 | (0.1) |

TABLE 8

Dispersibility evaluation result 2-4

| | Dispersant | KF-96-1000CS | Dispersant | Aluminum oxide | Dispersibility Shear viscosity [Pa · s] | Shear rate [1/s] |
|---|---|---|---|---|---|---|
| Example 3 | Synthesis Example 5 | 26 parts by mass | 0.5 part by mass | 100 parts by mass | 20.6 | (1) |
| Example 1 | Synthesis Example 5 | 26 parts by mass | 1 part by mass | 100 parts by mass | 18.9 | (1) |
| Example 4 | Synthesis Example 5 | 26 parts by mass | 5 parts by mass | 100 parts by mass | 10.6 | (1) |
| Example 5 | Synthesis Example 5 | 26 parts by mass | 10 parts by mass | 100 parts by mass | 5.7 | (1) |
| Example 6 | Synthesis Example 7 | 26 parts by mass | 1 part by mass | 100 parts by mass | 20.2 | (1) |
| Example 9 | Synthesis Example 7 | 14 parts by mass | 14 parts by mass | 100 parts by mass | 30.5 | (1) |
| Example 10 | Synthesis Example 7 | 0 part by mass | 26 parts by mass | 100 parts by mass | 49.4 | (1) |

<Preparation 3 of Samples for Dispersibility Evaluation>

Into an ointment pot container, a polydimethylsiloxane (KF-96-300CS produced by Shin-Etsu Chemical Co., Ltd.) being a silicone oil as a liquid medium, and the organopolysiloxane synthesized in Synthesis Example 5 as a dispersant were weighed. Further, as a dispersoid, aluminum oxide having an average diameter of 5 μm (DAW-03 produced by Denka Company Limited) and aluminum oxide having an average diameter of 50 μm (DAW-45 by Denka Company Limited) were weighed into the same, and the mixture was stirred with a spatula. KF-96-300CS, the organopolysiloxane synthesized in Synthesis Example 5, and the aluminum oxides were weighed so as to have the blending amounts shown in Tables 9 to 12. Next, a defoaming Rentaro Mixer of vacuum type (model: ARV-310) of THINKY Corporation was used to knead at 2000 rpm under the normal pressure for 1 minute and at 2000 rpm under a reduced pressure for 1 minute to prepare a sample.

<Dispersibility Evaluation 3>

The dispersibility evaluation samples prepared as above were evaluated for dispersibility by measuring the shear viscosities at different shear rates under the following conditions using a rheometer (MCR302 made by Anton Paar company).

Plate shape: circular flat plate of 25 mmϕ

Sample thickness: 1 mm

Temperature: 25±1° C.

Shear rate: 0.01 to 100 $s^{-1}$

Figure 10:
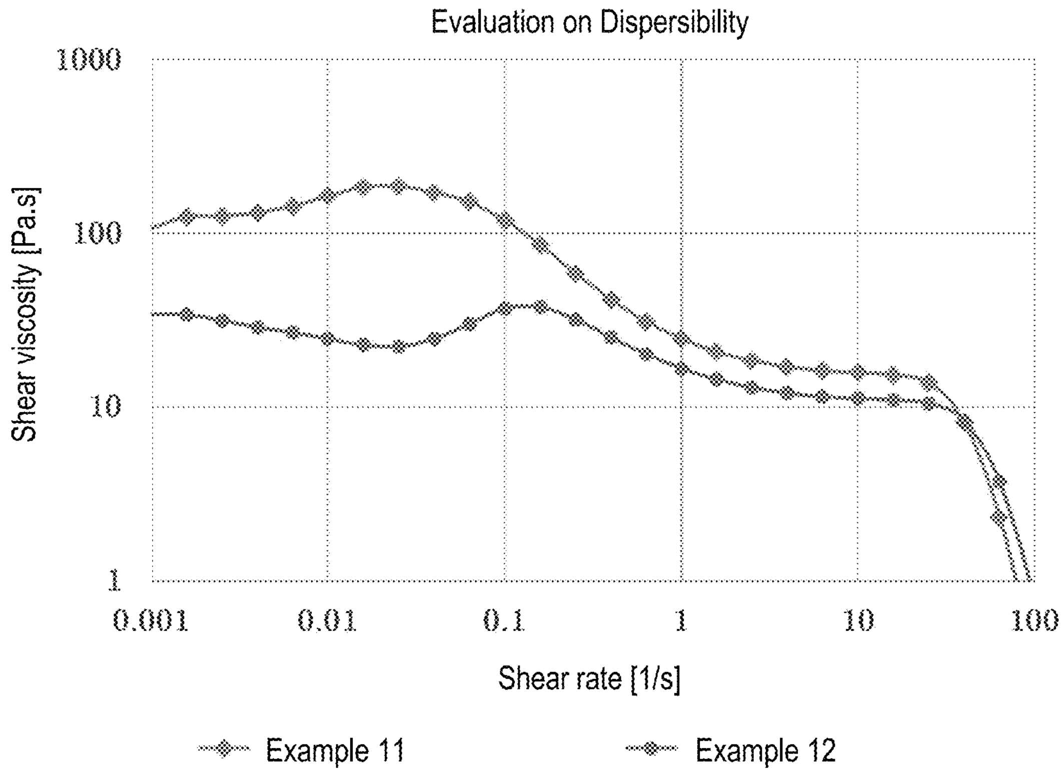
FIG. 10 is a graph showing the variation of the shear viscosity with the shear rate for the silicone dispersants of Examples 11-12.

In Examples 11 and 12, as shown in Tables 9 to 12, the organopolysiloxane having a partial structure where T structural units were contiguously linked as synthesized in Synthesis Example 5 was used as a dispersant, and was evaluated by measuring the shear viscosities at given shear rates. The results are shown in Tables 9 to 12 and FIG. 10.

TABLE 9

Dispersibility evaluation result 3-1

| | Dispersant | KF-96-300CS | Synthesis Example 5 | Aluminum oxide DAW-03 | Aluminum oxide DAW-45 | Dispersibility Shear viscosity [Pa · s] | Shear rate [1/s] |
|---|---|---|---|---|---|---|---|
| Example 11 | Synthesis Example 5 | 8.9 parts by mass | 5.0 parts by mass | 40 parts by mass | 60 parts by mass | 107 | (0.001) |
| Example 12 | Synthesis Example 5 | 13 parts by mass | 1.0 part by mass | 40 parts by mass | 60 parts by mass | 33.9 | (0.001) |

TABLE 10

| Dispersibility evaluation result 3-2 | | | | | | | |
|---|---|---|---|---|---|---|---|
| | | | | | | Dispersibility | |
| | Dispersant | KF-96-300CS | Synthesis Example 5 | Aluminum oxide DAW-03 | Aluminum oxide DAW-45 | Shear viscosity [Pa · s] | Shear rate [1/s] |
| Example 11 | Synthesis Example 5 | 8.9 parts by mass | 5.0 parts by mass | 40 parts by mass | 60 parts by mass | 163 | (0.01) |
| Example 12 | Synthesis Example 5 | 13 parts by mass | 1.0 part by mass | 40 parts by mass | 60 parts by mass | 24.6 | (0.01) |

TABLE 12

| Dispersibility evaluation result 3-4 | | | | | | | |
|---|---|---|---|---|---|---|---|
| | | | | | | Dispersibility | |
| | Dispersant | KF-96-300CS | Synthesis Example 5 | Aluminum oxide DAW-03 | Aluminum oxide DAW-45 | Shear viscosity [Pa · s] | Shear rate [1/s] |
| Example 11 | Synthesis Example 5 | 8.9 parts by mass | 5.0 parts by mass | 40 parts by mass | 60 parts by mass | 24.6 | (1) |
| Example 12 | Synthesis Example 5 | 13 parts by mass | 1.0 part by mass | 40 parts by mass | 60 parts by mass | 16.5 | (1) |

In the evaluation on dispersibility, the organopolysiloxane of this invention having a partial structure where T structural units are contiguously linked had a result that the shear viscosity was inhibited low when the shear rate was within the range of 0.001 to 0.06 $s^{-1}$, as compared to an organopolysiloxane having an alkoxysilyl at one end, and was thus confirmed to be good as a dispersant. It was also confirmed that the dispersant, which is an organopolysiloxane having a partial structure where T structural units are contiguously linked, could inhibit the shear viscosity low at each shear rate depending on the amount added.

INDUSTRIAL APPLICABILITY

The organopolysiloxane of this invention having a partial structure where T structural units are contiguously linked can be utilized as a dispersant for stably dispersing fillers in liquid media in fields such as cosmetics, liquid developers, oil-based inkjet inks, UV-curable inkjet inks, weak-solvent paints, offset inks, lubricants, detergents, pesticides, release agents, adhesives, thermally conductive materials, electrically conductive materials, and optical materials, etc.

The invention claimed is:

1. An organopolysiloxane having a partial structure where T structural units $[R_1SiO_{3/2}]$ are contiguously linked, wherein the partial structure where T structural units $[R_1SiO_{3/2}]$ are contiguously linked includes a structure represented by formula (1) and a structure represented by formula (2), (1)

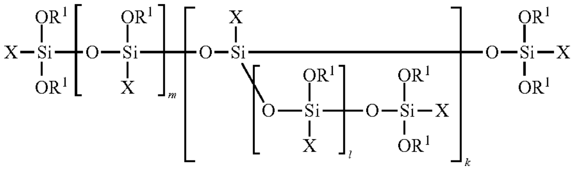

-continued (2)

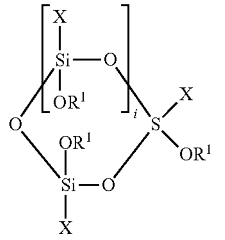

wherein in formulae (1) and (2), each $R^1$ is independently a saturated hydrocarbon group having 1 to 12 carbons, each X is independently a group represented by formula (3), acryloyl, alkyl, carboxyl, vinyl, methacryl, an aromatic group, amino, isocyanato, isocyanurato, epoxy, hydroxyl, or mercapto, wherein at least one X is a group represented by formula (3), m, l, and k are each independently 0 to 10, and j is 1 to 10;

(3)

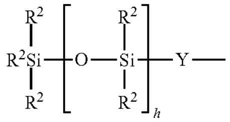

wherein in formula (3), each $R^2$ is independently a saturated hydrocarbon group having 1 to 12 carbons, or an aromatic hydrocarbon group having 6 to 12 carbons, Y is a divalent hydrocarbon group having 1 to 8 carbons, and h is 4 to 400.

2. The organopolysiloxane of claim 1, which is a reaction product of an organopolysiloxane represented by formula (4) and a trialkoxysilane, (4)

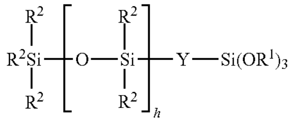

wherein in formula (4), each $R^1$ is independently a saturated hydrocarbon group having 1 to 12 carbons, each $R^2$ is independently a saturated hydrocarbon group having 1 to 12 carbons, or an aromatic hydrocarbon group having 6 to 12 carbons, Y is a divalent hydrocarbon group having 1 to 8 carbons, and h is 4 to 400.

3. A method for producing the organopolysiloxane of claim 2, comprising reacting an organopolysiloxane represented by formula (4) with a trialkoxysilane.

4. The organopolysiloxane of claim 1, which is obtained by intermolecularly reacting an organopolysiloxane represented by formula (4), (4)

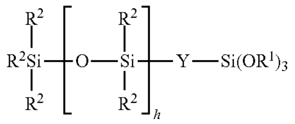

wherein in formula (4), each $R^1$ is independently a saturated hydrocarbon group having 1 to 12 carbons, each $R^2$ is independently a saturated hydrocarbon group having 1 to 12 carbons, or an aromatic hydrocarbon group having 6 to 12 carbons, Y is a divalent hydrocarbon group having 1 to 8 carbons, and h is 4 to 400.

5. A method for producing the organopolysiloxane of claim 4, comprising intermolecularly reacting an organopolysiloxane represented by formula (4) described in claim 4.

6. The method of claim 3, wherein an organometallic catalyst is used as a catalyst.

7. The organopolysiloxane of claim 1, which is a reaction product of an organopolysiloxane represented by formula (5) and a vinyl-having alkoxysilane oligomer, (5)

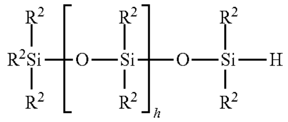

wherein in formula (5), each $R^2$ is independently a saturated hydrocarbon group having 1 to 12 carbons, or an aromatic hydrocarbon group having 6 to 12 carbons, and h is 4 to 400.

8. A method for producing the organopolysiloxane of claim 7, comprising reacting an organopolysiloxane represented by formula (5) described in claim 7 with a vinyl-having alkoxysilane oligomer.

9. A dispersant used to disperse a filler in a liquid medium, comprising the organopolysiloxane of claim 1.

10. The dispersant of claim 9, which has a number average molecular weight (Mn) of 500 to 100,000.

11. The dispersant of claim 9, which has a molecular weight distribution index (Mw/Mn) of 1.0 to 3.0.

12. A filler dispersion, containing: a filler, a liquid medium, and the organopolysiloxane of claim 1 as a dispersant.

13. The filler dispersion of claim 12, wherein with respect to 100 parts by mass of the filler, a content of the liquid medium is 4 to 50 parts by mass and a content of the dispersant is 0.1 to 20 parts by mass.

14. The method of claim 5, wherein an organometallic catalyst is used as a catalyst.

15. The dispersant of claim 10, which has a molecular weight distribution index (Mw/Mn) of 1.0 to 3.0.

* * * * *